US012340109B2

(12) United States Patent
Yoshida et al.

(10) Patent No.: US 12,340,109 B2
(45) Date of Patent: Jun. 24, 2025

(54) INFORMATION PROCESSING SYSTEM AND METHOD

(71) Applicant: Hitachi, Ltd., Tokyo (JP)

(72) Inventors: Misato Yoshida, Tokyo (JP); Hideo Saito, Tokyo (JP); Takaki Nakamura, Tokyo (JP); Akira Yamamoto, Tokyo (JP); Naruki Kurata, Tokyo (JP); Takahiro Yamamoto, Tokyo (JP)

(73) Assignee: HITACHI VINTARA, LTD., Kanagawa-Ken (JP)

( * ) Notice: Subject to any disclaimer, the term of this patent is extended or adjusted under 35 U.S.C. 154(b) by 2 days.

(21) Appl. No.: 17/946,728

(22) Filed: Sep. 16, 2022

(65) Prior Publication Data

US 2023/0153008 A1 May 18, 2023

(30) Foreign Application Priority Data

Nov. 15, 2021 (JP) .................. 2021-185914
Jul. 28, 2022 (JP) .................. 2022-121031

(51) Int. Cl.
G06F 3/06 (2006.01)

(52) U.S. Cl.
CPC .......... *G06F 3/0647* (2013.01); *G06F 3/0604* (2013.01); *G06F 3/067* (2013.01)

(58) Field of Classification Search
CPC ....... G06F 3/0647; G06F 3/0604; G06F 3/067
USPC ........................................ 711/165
See application file for complete search history.

(56) References Cited

U.S. PATENT DOCUMENTS

| | | | |
|---|---|---|---|
| 7,640,292 B1 * | 12/2009 | Smoot ................ | G06F 9/45558 718/1 |
| 9,959,280 B1 | 5/2018 | Whitehead et al. | |
| 10,154,112 B1 | 12/2018 | Anthony et al. | |
| 10,620,871 B1 * | 4/2020 | Mukku ............... | H04L 67/1097 |
| 11,372,828 B1 * | 6/2022 | Bendapudi ........... | G06F 16/258 |
| 2007/0073988 A1 | 3/2007 | Shibyama et al. | |
| 2013/0110778 A1 | 5/2013 | Taylor et al. | |
| 2013/0110967 A1 * | 5/2013 | Ueoka .................. | G06F 16/185 709/214 |
| 2015/0236977 A1 | 8/2015 | Terayama et al. | |

(Continued)

OTHER PUBLICATIONS

United States Office Action issued on Mar. 29, 2023 for U.S. Appl. No. 17/559,088.

(Continued)

*Primary Examiner* — Christopher B Shin
(74) *Attorney, Agent, or Firm* — Volpe Koenig

(57) ABSTRACT

Even without a first storage system does not have compatibility with a second storage system that is different from a default cloud storage service which can be accessed by a cloud computer service as a migration destination of a computer instance, a volume in the first storage system can be migrated to the second storage system. A system causes a migration tool of a cloud computer to migrate, from a first storage system to the cloud computer, a system volume storing an image of an OS for configuring a computer instance to be migrated, and a data volume storing data used by the OS, and creates a mapping volume, which has been mapped to the data volume migrated to the cloud computer with the migration tool, in a second storage system, and sets a path of data input/output from the computer instance to the mapping volume in the computer instance.

19 Claims, 17 Drawing Sheets

(56) References Cited

U.S. PATENT DOCUMENTS

2017/0060628 A1    3/2017    Tarasuk-Levin et al.
2018/0173554 A1    6/2018    Caradonna et al.
2020/0379660 A1    12/2020    Ciudad et al.

OTHER PUBLICATIONS

United States Office Action issued on Aug. 21, 2023 for U.S. Appl. No. 17/559,088.

United States Office Action issued on Dec. 1, 2023 for U.S. Appl. No. 17/559,088.

"Pure Cloud Block Store vVol VM Migration to AWS with CloudEndure", webpage, last accessed Aug. 10, 2022, 12 pages. <https ://support.purestorage.com/Pure_Cloud_Block_Store/Pure_Cloud_Block_Store_vVol_ VM_Migration_to_AWS_withCloudEndure>.

"Transferring VMware data from an on-premises FlashArray to CBS", webpage, last accessed Aug. 10, 2022, 50 pages. <https://support.purestorage.com/Pure_Cloud_Block_Store/Transferring_VMware_data_from_an_on-premises_FlashArray_to_CBS>.

United States Office Action for U.S. Appl. No. 17/559,088, dated Apr. 4, 2022. 22 pages.

United States Office Action issued on May 10, 2024 for U.S. Appl. No. 17/559,088.

United States Office Action issued on Jun. 27, 2024 for U.S. Appl. No. 17/559,088.

\* cited by examiner

INFORMATION PROCESSING SYSTEM AND METHOD

CROSS-REFERENCE TO PRIOR APPLICATION

This application relates to and claims the benefit of priority from Japanese Patent Application No. 2021-185914, filed on Nov. 15, 2021, and Japanese Patent Application No. 2022-121031, filed on Jul. 28, 2022 the entire disclosure of which is incorporated herein by reference.

BACKGROUND

The present invention generally relates to information processing and, for example, specifically relates to information processing for supporting the migration of a computer and a volume.

Known is a technology for migrating, to a cloud environment (predominantly a public cloud environment), a computer using a volume in a first storage system (for example, on-premises storage system) and a volume used in the computer (volume in the first storage system). According to this type of technology, migration of a computer or a volume to a cloud environment is performed using a cloud migration tool. A cloud migration tool is a typically a system provided by a cloud environment vendor.

A computer is migrated as a computer instance to a cloud computer service, and a volume is migrated to a predetermined default cloud storage service that can be accessed by a cloud computer service (typically, a cloud storage service provided by a cloud environment vendor).

As volumes used by a computer, there are a system volume (this may also be referred to as an activation volume) as a volume for storing an image of an OS (Operating System) of a computer, and a data volume as a volume for storing data input to or output from a computer.

There may be users who wish for at least the migration destination of a data volume to be a second storage system that is different from the default cloud storage service. A second storage system is typically a storage system which is superior in reliability or function in comparison to a default cloud storage service. Specifically, for example, a second storage system is a cloud storage service of the same cloud environment but a cloud storage service developed by a storage vendor and not by a cloud environment vendor.

According to the technology disclosed in NPTL 1, the migration destination of a data volume may be a cloud storage service as a second storage system (migration destination storage system) provided by a storage vendor of a first storage system (migration source storage system), rather than a default cloud storage service. A cloud migration tool is not used in the migration of a data volume from a first storage system to a second storage system, and an original tool provided by the storage vendor; specifically, a so-called remote copy function of migrating a volume between storage systems, is used.

According to the technology disclosed in NPTL 2, in an on-premises environment, a virtual machine such as a hypervisor in a virtual environment recognizes a volume (hereinafter referred to as a "storage volume") in an on-premises storage system. The format of the storage volume defers to the virtual environment. A virtual machine executes an application, and a storage volume has a volume for each application in the virtual machine. The volume of each application is migrated from the on-premises storage system to the cloud storage system provided by the same vendor as the vendor of the storage system. In the foregoing migration, since the format of the storage volume of the on-premises environment defers to the virtual environment of the on-premises environment, the storage volume is migrated to the cloud storage system after the data storage format of the storage volume is converted in the on-premises environment in advance.

CITATION LIST

Non-Patent Literature

[NPTL 1] Pure Cloud Block Store vVol VM Migration to AWS with CloudEndure https://support.purestorage.com/Pure_Cloud_Block_Store/Pure_Cloud_Block_Store_vVol_VM_Migration_to_AWS_with_CloudEndure

[NPTL 2] Transferring VMware data from an on-premises FlashArray to CBS https://support.purestorage.com/Pure_Cloud_Block_Store/Transferring_VMware_data_from_an_on-premises_FlashArray_to_CBS

SUMMARY

Nevertheless, with the technology disclosed in NPTL 1, a first storage system as a migration source of a data volume to be migrated to a second storage system is limited to a storage system having compatibility with a second storage system. Storage systems that do not have compatibility with a second storage system are, for example, as follows.

A storage system provided by a storage vendor that is different from a storage vendor of a second storage system.

A storage system of a different type (for example, different model) than a second storage system as a storage system provided by a storage vendor of a second storage system.

Even with the technology disclosed in NPTL 2, since migration is performed between the storage systems of the same vendor, the foregoing problem still remains. Even in the migration between the storage systems of the same vendor, with the technology disclosed in NPTL 2, in order to enable an application to interpret data in its volume without a virtual environment at the migration destination, it is necessary to prepare a volume, which does not depend on the format of the virtual environment, in the on-premises storage system, and copy data from the volume in the storage volume to the prepared volume described above. Thus, the on-premises storage system will need, for each application, a storage resource for the volume (copy destination volume) that does not depend on the format of the virtual environment.

An information processing system communicable with a cloud computer, a first storage system and a second storage system is constructed. When migrating a computer instance to a cloud computer and migrating data used by the computer instance from the first storage system to the second storage system, the information processing system causes a migration tool of the cloud computer to migrate, from the first storage system to the cloud computer, a system volume storing an image of an OS (Operating System) for configuring the computer instance to be migrated, and a data volume storing data used by the OS. The information processing system creates a mapping volume, which has been mapped to the data volume migrated to the cloud computer with the migration tool of the cloud computer, in the second storage system, and sets a path of data input/output from the computer instance to the mapping volume in the computer instance.

Even without a first storage system does not have compatibility with a second storage system that is different from a default cloud storage service which can be accessed by a cloud computer service as a migration destination of a computer instance, a volume in the first storage system can be migrated to the second storage system without having to prepare a volume of a copy destination of the volume to be migrated in the first storage system.

DESCRIPTION OF EMBODIMENTS

Figure 1:
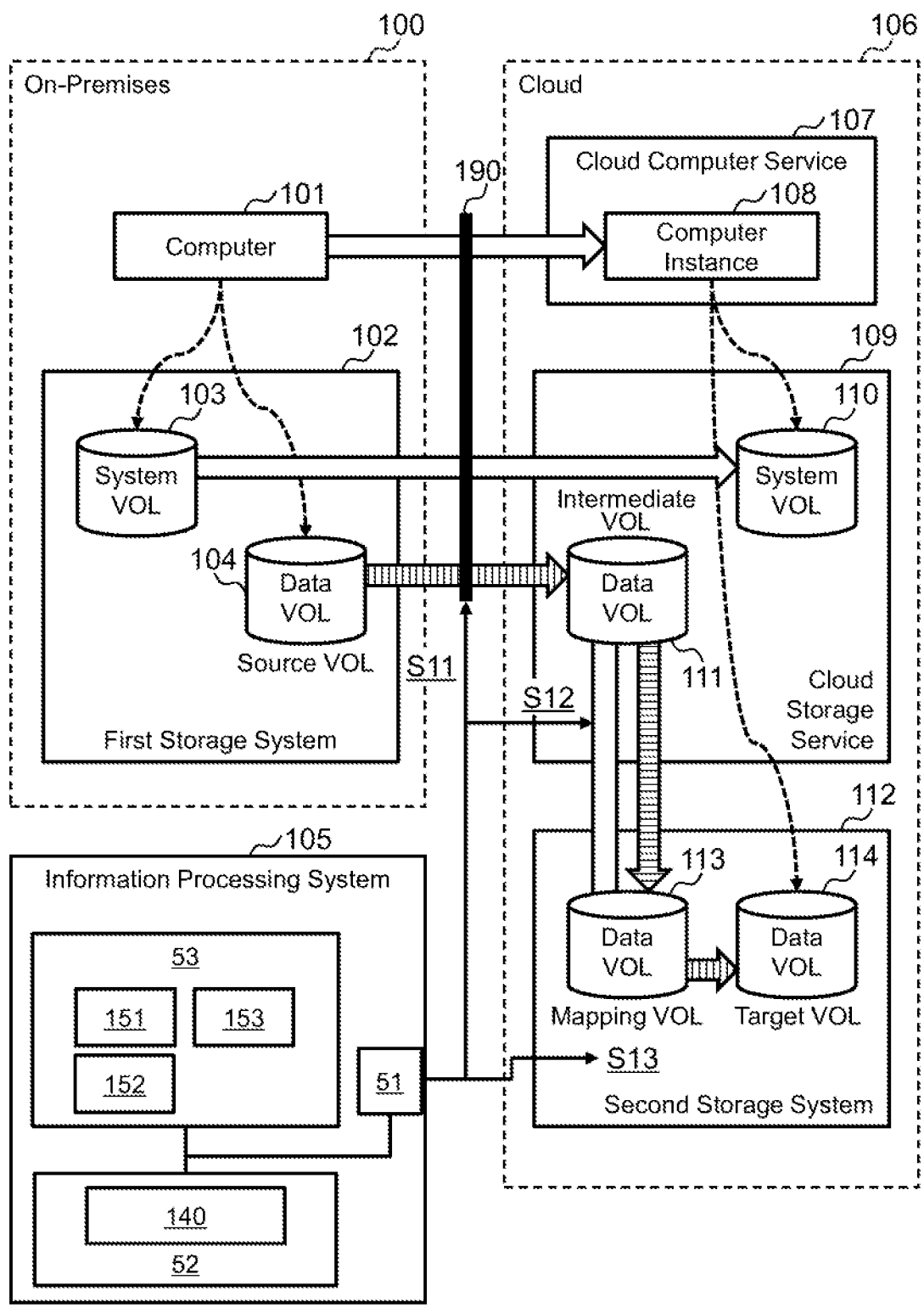
FIG. 1 is a diagram showing an overview of the system migration according to the first embodiment.

In the following explanation, "interface device" may be one or more interface devices. The one or more interface devices may be at least one of the following.

One or more I/O (input/Output) interface devices. An I/O (input/Output) interface device is an interface device to at least one of either an I/O device or a remote display computer. An I/O interface device to a display computer may be a communication interface device. At least one I/O device may be a user interface device, for example, one of either an input device such as a keyboard or a pointing device, or an output device such as a display device.

One or more communication interface devices. One or more communication interface devices may be one or more same type of communication interface devices (for example, one or more NICs (Network Interface Cards)) or two or more different types of communication interface devices (for example, an NIC and an HBA (Host Bus Adapter)).

Moreover, in the following explanation, "memory" is one or more memory devices as an example of one or more storage devices, and is typically a primary storage device. At least one memory device in a memory may be a volatile memory device or a nonvolatile memory device.

Moreover, in the following explanation, "persistent storage device" may be one or more persistent storage devices as an example of one or more storage devices. A persistent storage device may typically be a non-volatile storage device (for example, auxiliary storage device), and may specifically be, for example, an HOD (Hard Disk Drive), an SSD (Solid State Drive), an NVME (Non-Volatile Memory Express) drive, or an SCM (Storage Class Memory).

Moreover, in the following explanation, "storage device" may be at least a memory or a memory of a persistent storage device.

Moreover, in the following explanation, "processor" may be one or more processor devices. While at least one processor device may typically be a microprocessor device such as a CPU (Central Processing Unit), or may be another type of processor device such as a GPU (Graphics Processing Unit). At least one processor device may be a single-core processor device or a multi-core processor device. At least one processor device may be a processor core. At least one processor device may be a processor device in a broad sense such as a circuit (for example, FPGA (Field-Programmable Gate Array), CPLD (Complex Programmable Logic Device) or ASIC (Application Specific Integrated Circuit)) as an aggregate of gate arrays based on a hardware description language which performs a part or all of the processing.

Moreover, in the following explanation, while a function may be explained using an expression such as "yyy unit", the function may be realized by one or more computer programs being executed with a processor, or realized by one or more hardware circuits (for example, FPGA or ASIC), or realized based on a combination thereof. When a function is realized by a program being executed with a processor, since predetermined processing will be performed using a storage device and/or an interface device as appropriate, the function may also be at least a part of the processor. Processing explained with a function as the subject may be processing performed by a processor or a device including such processor.

Moreover, a program may be installed from a program source. A program source may be, for example, a recording medium (for example, non-temporary recording medium) readable with a program distribution computer or a computer. The explanation of each function is an example, and a plurality of functions may be consolidated into one function, or one function may be divided into a plurality of functions.

Moreover, as information for identifying elements, arbitrary information (for example, at least one among "ID", "name", and "number") may be adopted.

Moreover, in the following explanation, "volume" may be a logical storage space (address space). A volume may be a substantive volume (volume based on a physical storage device (for example, persistent storage device)), or a virtual volume.

Several embodiments of the present invention are now explained with reference to the appended drawings. In the following drawings, "volume" is indicated as "VOL". Moreover, the migration of a volume means the migration of data stored in a volume.

First Embodiment

FIG. 1 is a diagram showing an overview of the system migration according to the first embodiment.

An environment of a migration source is an on-premises environment 100. A computer system in the on-premises environment 100 includes a computer 101, and a first storage system 102 connected to the computer 101. The computer 101 may be a physical computer, and the first storage system 102 may be a physical storage system (for example, so-called disk array device). The first storage system 102 corresponds to a storage system of a migration source. Of the computer 101 and the first storage system 102, a plurality of computers 101 may exist. The first storage system 102 may comprise a plurality of volumes.

An environment of a migration destination is a cloud environment 106 (typically, a public cloud environment). In the cloud environment 106, a cloud computing service such as a cloud computer service 107 or a cloud storage service 109 is provided. The cloud computer service 107 may be an instance execution environment, and the cloud storage service 109 is a predetermined default cloud storage service that can be accessed by the cloud computer service 107.

The second storage system 112 corresponds to a storage system of a migration destination. In this embodiment, the second storage system 112 is a cloud storage service provided in the cloud environment 106.

The cloud environment 106 is an environment (for example, cloud platform) provided by a cloud vendor, and the cloud computer service 107 and the cloud storage service 109 may be a cloud computing service provided by the cloud vendor. For example, the cloud computer service 107 may be Amazon EC2 (Amazon Elastic Compute Cloud), and the cloud storage service 109 may be Amazon EBS (Amazon Elastic Block Store) ("Amazon" is a registered trademark). The second storage system 112 may be a cloud storage service developed by a storage vendor. Preferably, the second storage system 112 is superior in reliability or function in comparison to the cloud storage service 109.

The migration of a computer or a volume to the cloud environment 106 in an environment that is different from the cloud environment 106 (for example, cloud environment that is different from the on-premises environment 100 or the cloud environment 106) is performed by a cloud migration tool 190. In other words, in this embodiment, while the migration target is migrated from the on-premises environment 100 to the cloud environment 106, the present invention may also be applied to the migration from a different cloud environment to the cloud environment 106. The cloud migration tool 190 is typically a system (function) provided by a vendor of the cloud environment 106.

An information processing system 105 is constructed. The information processing system 105 is a system which supports the migration of the migration target (for example, computer or volume) from a migration source to a migration destination. The information processing system 105 may also be referred to as a management system. The information processing system 105 may be located outside the on-premises environment 100 and the cloud environment 106 as illustrated in the diagram, or may be located inside the on-premises environment 100 or the cloud environment 106.

While the information processing system 105 is a physical system (for example, computer) in this embodiment, it may also be a logical system provided in the physical storage resource. The information processing system 105 can operate, via a communication medium such as a network or a dedicated line, at least one among a computer 101, a first storage system 102, a cloud migration tool 190, a cloud computer service 107, a computer instance 108, a cloud storage service 109 and a second storage system 112. The information processing system 105 may also operate the cloud storage service 109 based on instructions to the second storage system (or without going through another system such as the second storage system 112).

The information processing system 105 includes an interface device 51, a storage device 52, and a processor 53 connected thereto.

The interface device 51 is connected, for example, to the foregoing communication medium (for example, network).

The storage device 52 stores programs and information. As such information, for example, there is management information 140. The management information 140 is information that is referenced or updated as needed for the system migration processing (see FIG. 5) to be performed by the information processing system 105. The management information 140 may include information representing the progress of the system migration processing; for example, the management information 140 may include the information of (a) to (c) below.
  (a) Computer migration management information as information related to a computer to be migrated from the on-premises environment 100 to the cloud environment 106. The computer migration management information includes, for example, identifying information of the computer for each computer to be migrated, and information representing the migration status of the computer (for example, migration not yet started, migration start or migration complete).
  (b) Volume migration management information as information related to a volume to be migrated from the on-premises environment 100 to the cloud environment 106. The volume migration management information includes, for example, identifying information of the volume for each volume to be migrated, and information representing the migration status of the volume (for example, migration not yet started, migration start or migration complete).
  (c) Intermediate volume management information as information related to an intermediate volume 111 described later in the cloud storage service 109. The intermediate volume management information includes, for example, identifying information of the intermediate volume 111 for each intermediate volume 111 information representing the migration status of the intermediate volume 111 (for example, creation standby, creation complete, migration start, migration complete, deletion start or deletion complete), identifying information of the mapping volume 113 as a volume in which the intermediate volume 111 is virtualized, and identifying information of the target volume 114 as a migration destination of the mapping volume 113.

As a result of the processor 53 executing programs, functions such as the tool operating unit 151, the migration completion confirmation unit 152 and the migration control unit 153 are realized.

While the first storage system 102 provides a volume to the computer 101, as the volume recognized by the computer 101, there are a system volume 103 and a data volume 104. In other words, a path which connects the computer 101 and the system volume 103 and a path which connects the computer 101 and the data volume 104 are provided (see the dashed line arrow extending from the computer 101). The system volume 103 is a volume storing an image of an OS (Operating System) of the computer 101, and is typically a volume for activating the computer 101. The data volume 104 is a volume storing data that is input/output by the activated computer 101 (for example, application executed by the computer 101).

The cloud migration tool 190 is a system (function) which migrates the computer 101 as the computer instance 108 to the cloud computer service 107, and migrates the system volume 103 of the computer 101 to the cloud storage service 109.

In this embodiment, the system migration processing of migrating a computer and a volume from the on-premises environment 100 to the cloud environment 106 is performed based on the following flow.

The tool operating unit 151 issues a migration instruction to the cloud migration tool 190 which designates the computer 101 to be migrated, and the data volume 104 recognized by the computer 101 (S11). For example, the identifying information of the computer 101 and the identifying information of the data volume 104 (for example, volume identifying information recognized by the computer 101) are designated. The system volume 103 recognized by the computer 101 may be designated in the cloud migration tool 190 as the migration target as with the data volume 104, or, if the computer 101 is designated, it may be deemed to have been designated as the migration target without the designation of the system volume 103. In either case, in this example, the computer 101, the system volume 103 and the data volume 104 illustrated in the diagrams are the migration targets. Note that the designation of the data volume 104 to be migrated in S11 may be performed with a separate means such as deleting (detaching) the data volume 104 to be migrated from the computer 101 before the migration instruction is issued to the cloud migration tool 190.

In response to the migration instruction, the cloud migration tool 190 performs the cloud migration processing including the migration of the computer 101, the system volume 103 and the data volume 104. Specifically, the cloud migration tool 190 migrates the designated computer 101 as the computer instance 108 to the cloud computer service 107. Moreover, the cloud migration tool 190 migrates the system volume 103 as the system volume 110 to the cloud storage service 109 (specifically, for example, migration from the volume 103 to the volume 110). Moreover, the cloud migration tool 190 migrates the data volume 104 as the intermediate volume 111 to the cloud storage service 109 (specifically, for example, migration from the volume 104 to the volume 111). The intermediate volume 111 is a volume that was migrated to the cloud storage service 109 of the data volume 104.

The migration completion confirmation unit 152 confirms that the foregoing cloud migration processing was completed by the cloud migration tool 190 in response to the migration instruction. When the cloud migration processing is completed, the computer instance 108 can access the system volume 110 (see the dashed line arrow extending from the computer instance 108 to the system volume 110). The computer instance 108 refers to the system volume 110 and is activated (for example, reads the image of the OS).

After the completion of the cloud migration processing is confirmed by the migration completion confirmation unit 152, the migration control unit 153 creates, in the second storage system 112, the mapping volume 113 as the volume in which the intermediate volume 111 is virtualized, and migrates data to the target volume 114 from the mapping volume 113 in an online status which enables the I/O of data to and from the computer instance 108. One volume may concurrently serve as the mapping volume 113 and the target volume 114.

Specifically, for example, the migration control unit 153 causes the second storage system 112 to execute an external connection which associates the intermediate volume 111 with the second storage system 112 (S12). The intermediate volume 111 is thereby recognized by the second storage system 112.

The migration control unit 153 thereafter creates, in the second storage system 112, the mapping volume 113 as the volume in which the externally connected intermediate volume 111 is virtualized (volume to which the intermediate volume 111 was mapped). When the mapping volume 113 is created, the migration control unit 153 causes the mapping volume 113 to become an online status which enables the I/O of data to and from the computer instance 108. Specifically, for example, the migration control unit 153 causes the second storage system 112 to provide the mapping volume 113 to the computer instance 108 (for example, causes the computer instance 108 to recognize the mapping volume 113), and starts the process of the second storage system 112 receiving the I/O request designating the mapping volume 113. The migration control unit 153 may permit the computer instance 108 to issue an I/O request to the mapping volume 113, and the computer instance 108 that received the permission may send, to the second storage system 112, the I/O request designating the mapping volume 113 as needed according to the processing of the computer instance 108.

The migration control unit 153 causes the second storage system 112 to migrate data from the mapping volume 113 to the target volume 114 (S13). Data is thereby migrated from the mapping volume 113 (specifically, intermediate volume 111 mapped to the mapping volume 113) to the target volume 114. When this data migration is completed, the I/O of data to and from the target volume 114 of the computer instance 108 is thereby enabled (see the dashed line arrow extending from the computer instance 108 to the target volume 114).

According to the system migration processing described above, the migration of data from the source volume (data volume) 104 of the first storage system 102 to the target volume 114 of the second storage system 112 is realized without a remote copy function of copying data from the first storage system 102 to the second storage system 112 (for example, function of performing remote copy in volume (volume recognized by the storage system) units between storage systems). Thus, even if the first storage system 102 has no compatibility with the second storage system 112, the data volume 104 in the first storage system 102 can be migrated to the second storage system 112 as a cloud storage service with superior reliability or function in comparison to the default cloud storage service 109. Note that the second storage system 112 may also exist in an environment that is different from the cloud environment 106 (for example, different cloud environment).

Note that, according to the example shown in FIG. 1, while the volume to be migrated to the second storage system 112 is the data volume 104, the system volume 103 may also be migrated to the second storage system 112. In other words, as a result of the system volume 110 being migrated as an intermediate volume, a mapping volume in which the intermediate volume is virtualized being created in the second storage system 112, and data being migrated from the mapping volume to the target volume, the target volume may become a system volume that was migrated to the second storage system 112.

Moreover, when there are a plurality of data volumes 104 as the data volumes recognized by the computer 101, all or a part of the data volumes 104 among the plurality of data volumes 104 may also be migrated to the second storage system 112.

Figure 2:
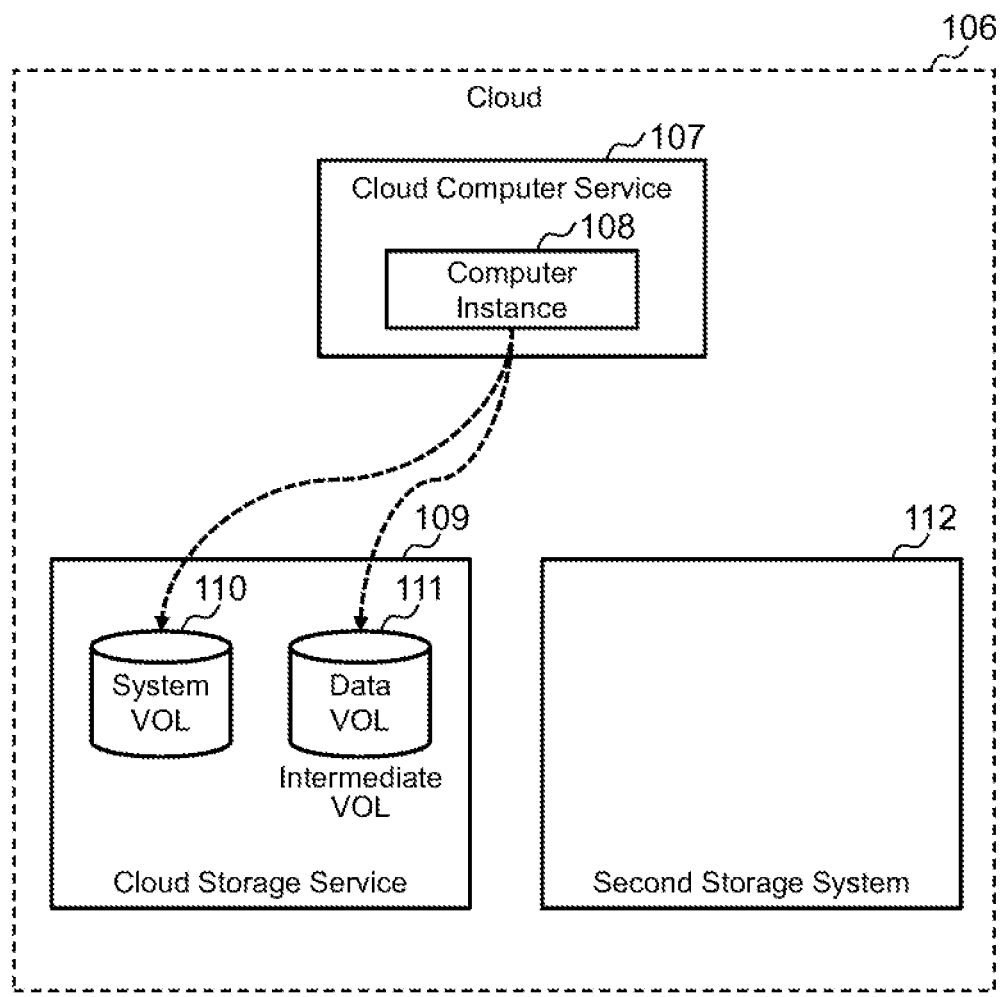
FIG. 2 is a diagram showing the configuration of the cloud environment after completion of the cloud migration processing.
Figure 3:
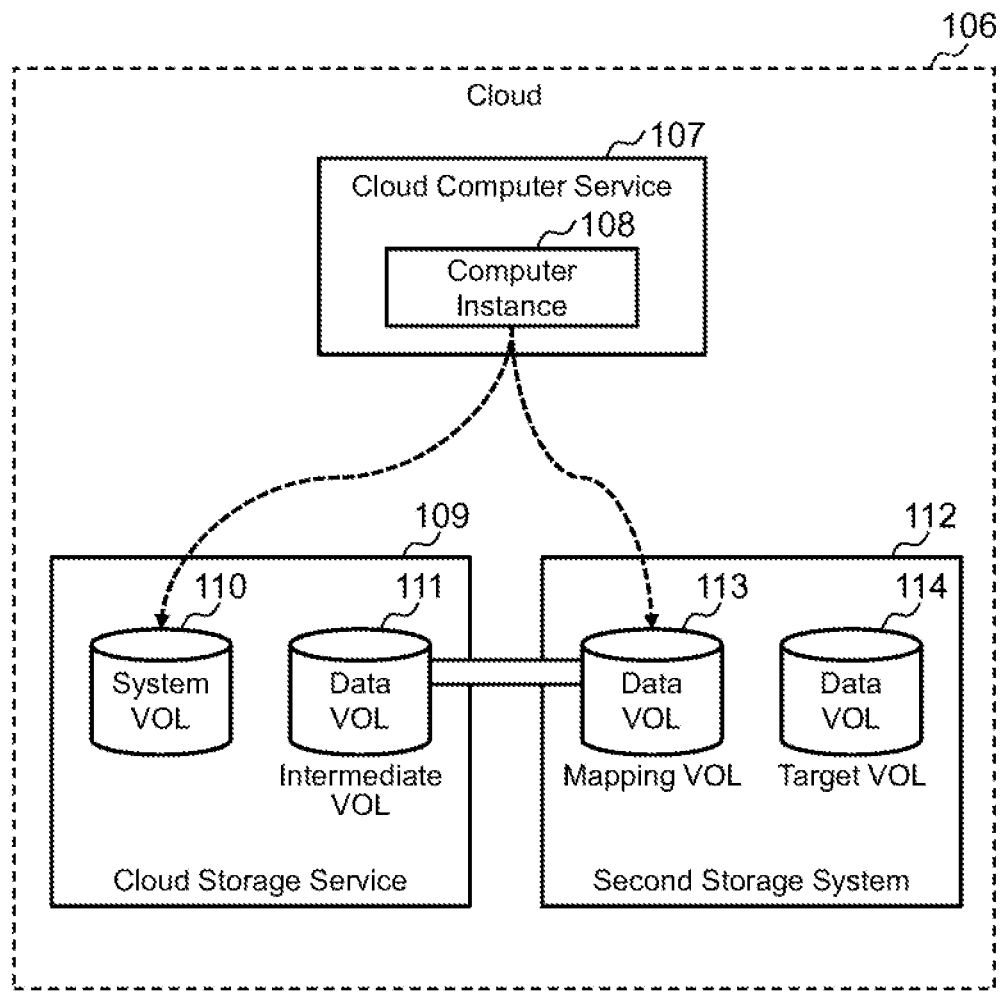
FIG. 3 is a diagram showing the configuration of the cloud environment after creation of the mapping volume.
Figure 4:
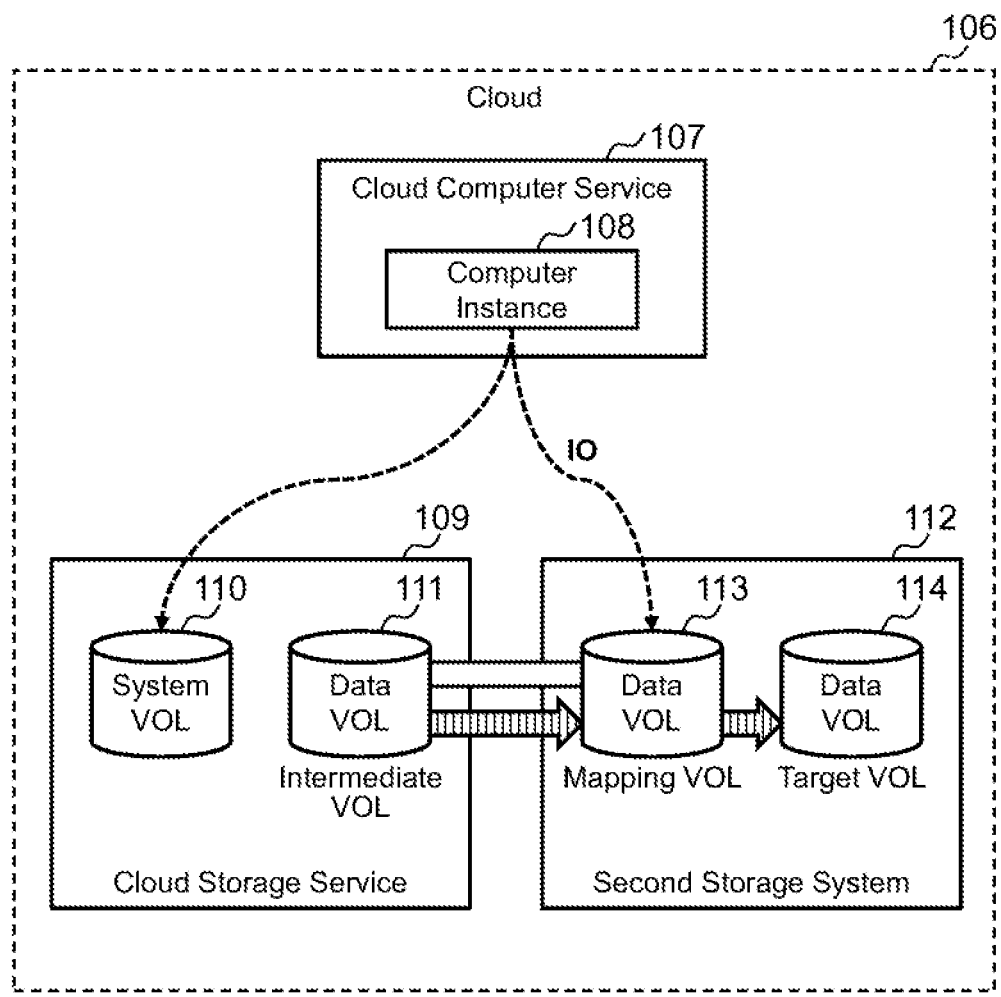
FIG. 4 is a diagram showing the migration of data from the mapping volume to the target volume.

The foregoing explanation related to the system migration processing is now supplemented with reference to FIG. 2 to FIG. 4.

FIG. 2 is a diagram showing the configuration of the cloud environment 106 after completion of the cloud migration processing.

When the cloud migration processing performed by the cloud migration tool 190 is completed, the intermediate volume 111 is connected to the computer instance 108 in addition to the system volume 110. In other words, a path which connects the computer instance 108 and the intermediate volume 111 is provided (see the dashed line arrow extending from the computer instance 108 to the intermediate volume 111). Here, the I/O of data by the computer instance 108 to and from the intermediate volume 111 may also be started.

Nevertheless, in this embodiment, the migration control unit 153 is set so that the I/O of data by the computer instance 108 to and from the intermediate volume 111 is not started. Specifically, for example, the migration control unit 153 may perform at least one of the following.

Not permitting the computer instance 108 to issue an I/O request designating the intermediate volume 111 (for example, prohibiting the computer instance 108 from issuing an I/O request designating the intermediate volume 111).

Not allowing the cloud storage service 109 to start receiving an I/O request designating the intermediate volume 111 (for example, prohibiting the cloud storage service 109 from receiving an I/O request designating the intermediate volume 111).

FIG. 3 is a diagram showing the configuration of the cloud environment 106 after creation of the mapping volume 113.

The intermediate volume 111 is externally connected to the second storage system 112. The external connection method depends on the cloud storage service 109 which includes the intermediate volume 111. A specific example of the external connection method will be described later.

The mapping volume 113, a volume in which the intermediate volume 111 externally connected to the second storage system 112 is virtualized, is created in the second storage system 112. The I/O of data from the computer instance 108 to and from the created mapping volume 113 is started. For example, a path which connects the computer instance 108 and the mapping volume 113 is provided in response to an instruction from the migration control unit 153 to the second storage system 112. An I/O request is issued from the computer instance 108 via the path, and the I/O of data to and from the mapping volume 113 is performed by the second storage system 112 in response to the I/O request.

In cases where a path which connects the computer instance 108 and the intermediate volume 111 is provided, the migration control unit 153 may also instruct the cloud storage service 109 (and/or computer instance 108) to delete the path (for example, off-lining, or deleting the path setting itself) before a path which connects the computer instance 108 and the mapping volume 113 is provided. The path may also be deleted in response to the instruction. In cases where the computer instance 108, the cloud storage service 109 and the second storage system 112 are equipped with a multipath function, there may be a time when the path which connects the computer instance 108 and the intermediate volume 111 and the path which connects the computer instance 108 and the mapping volume 113 coexist.

FIG. 4 is a diagram showing the migration of data from the mapping volume 113 to the target volume 114.

During the migration of data from the mapping volume 113 to the target volume 114, the I/O of data to and from the mapping volume 113 (and target volume 114) (reception and processing of an I/O request designating the identifying information of the mapping volume 113) is possible. Specifically, for example, when the second storage system 112 receives an I/O request designating the identifying information of the mapping volume 113, the following may be performed.

The second storage system 112 determines whether the volume area (area in the volume) of the I/O destination is an area in which the migration of data has been completed.

When the result of the determination is false, the second storage system 112 performs the I/O of data to and from the mapping volume 113 (in other words, I/O of data to and from the intermediate volume 111).

When the result of the determination is true, the second storage system 112 performs the I/O of data to and from the target volume 114.

In other words, the mapping volume 113 and the target volume 114 may be recognized as one volume, without differentiation, by the computer instance 108. When the second storage system 112 receives an I/O request designating the one volume, depending on whether the volume area (for example, LBA (Logical Block Address)) designated in the I/O request is a migrated area, the second storage system 112 may perform the I/O of data to and from the mapping volume 113 or the target volume 114 according to the I/O request.

Moreover, in the cloud migration processing, the identifying information of the data volume (source volume) 104, which is also the identifying information recognized by the computer 101, may be succeeded by the intermediate volume 111. The foregoing identifying information may also be succeeded by the mapping volume 113 in which the intermediate volume 111 is virtualized. The identifying information succeed by the mapping volume 113 (identifying information of the data volume (source volume) 104) may also be recognized by the computer instance 108. While data is being migrated from the mapping volume 113 to the target volume 114, the second storage system 112 may receive the I/O request designating the identifying information from the computer instance 108. After the migration of data from the mapping volume 113 to the target volume 114 is completed, the identifying information (identifying information of the data volume (source volume) 104) may be succeeded by the target volume 114. Based on this kind of succession of the identifying information, the computer instance 108 can, after the migration of the computer 101, access the target volume 114 by using the identifying information that is the same as the identifying information of the data volume (source volume) 104.

The system migration processing according to this embodiment is now explained.

Figure 5:
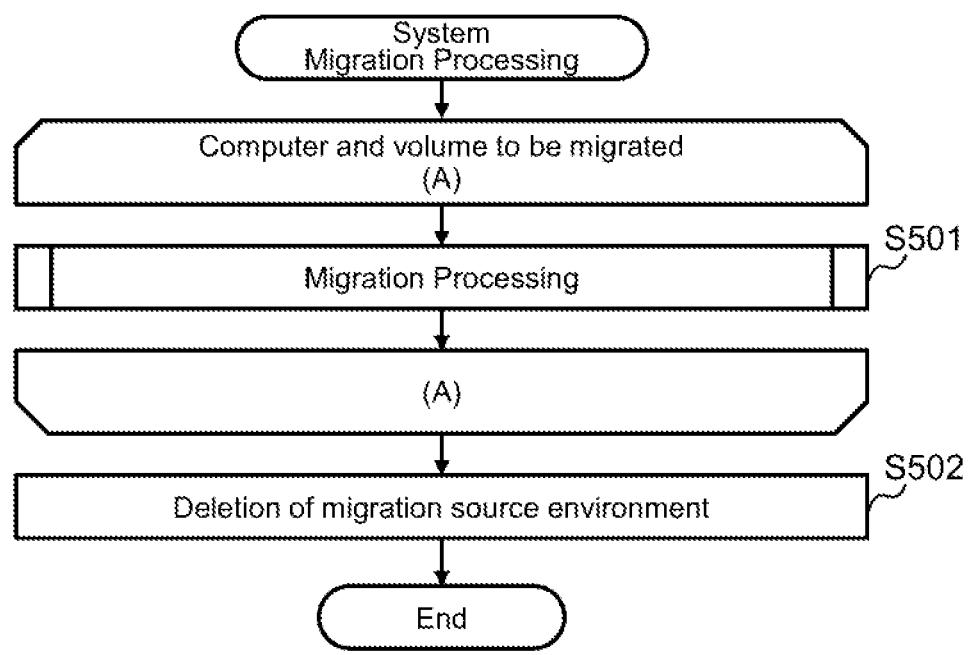
FIG. 5 is a diagram showing a flow of the system migration processing.

FIG. 5 is a diagram showing a flow of the system migration processing.

The migration processing is performed for each migration target (computer and volume) in a migration source environment (on-premises environment 100 in this embodiment) (S501). When all migration targets are migrated from the migration source environment, deletion of the migration source environment may also be performed (S502).

In the system migration processing, when there are a plurality of data volumes 104, migration of the plurality of data volumes 104 may also be performed in parallel. In other words, each time that the completion of migration of each data volume 104 to the cloud storage service 109 is confirmed, external connection to the second storage system 112 of the intermediate volume 111 corresponding to the data volume 104, creation of the mapping volume 113 in which the intermediate volume 111 is virtualized, and migration of data from the mapping volume 113 to the target volume 114 in a state where the mapping volume 113 is offline, may be performed. In other words, completion of the cloud migration processing may also be confirmed for each data volume 104. The reduction of time required for the system migration processing can thereby be expected.

Figure 6:
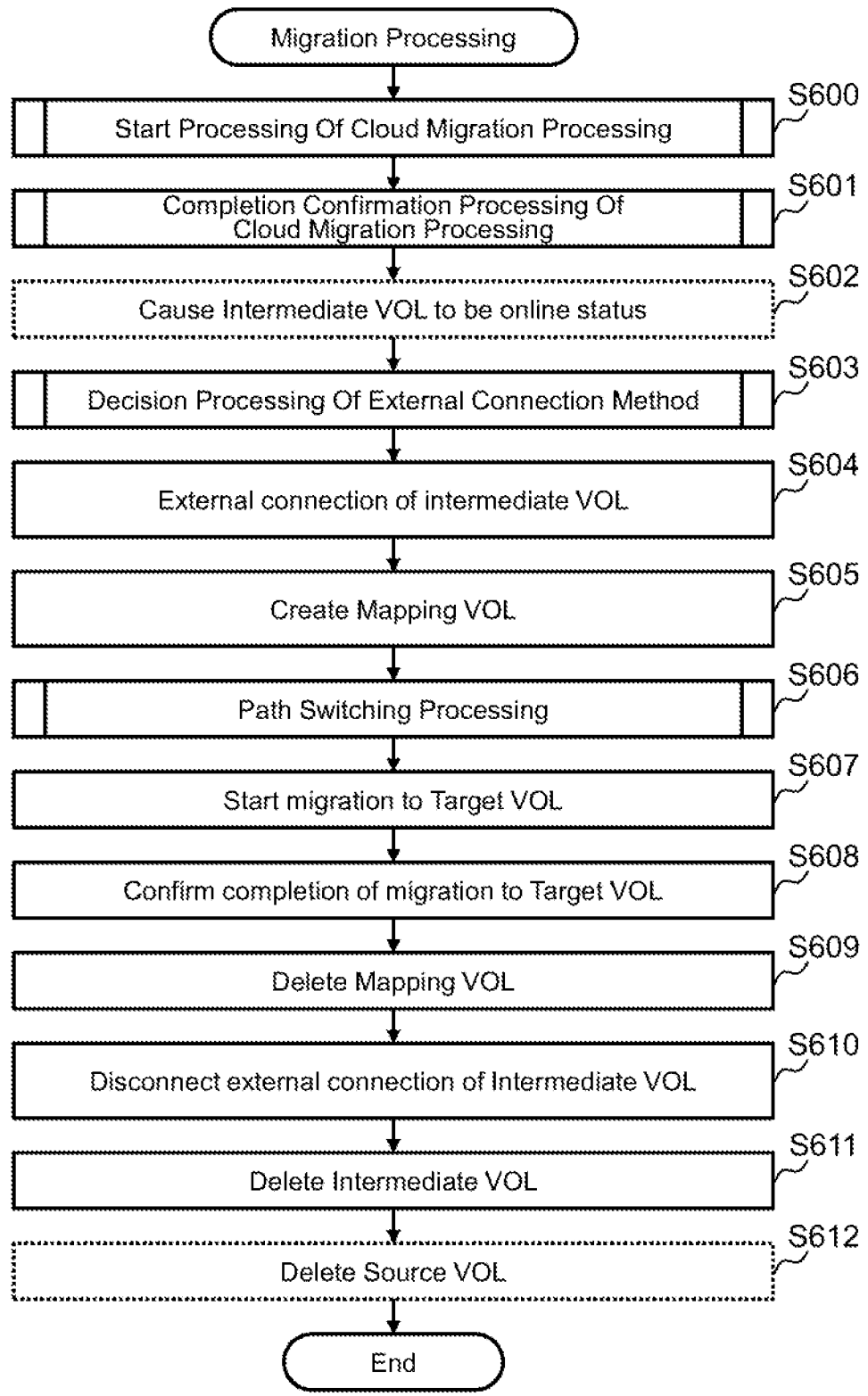
FIG. 6 is a diagram showing a flow of the migration processing.

FIG. 6 is a diagram showing a flow of the migration processing (S501 of FIG. 5).

Figure 7:
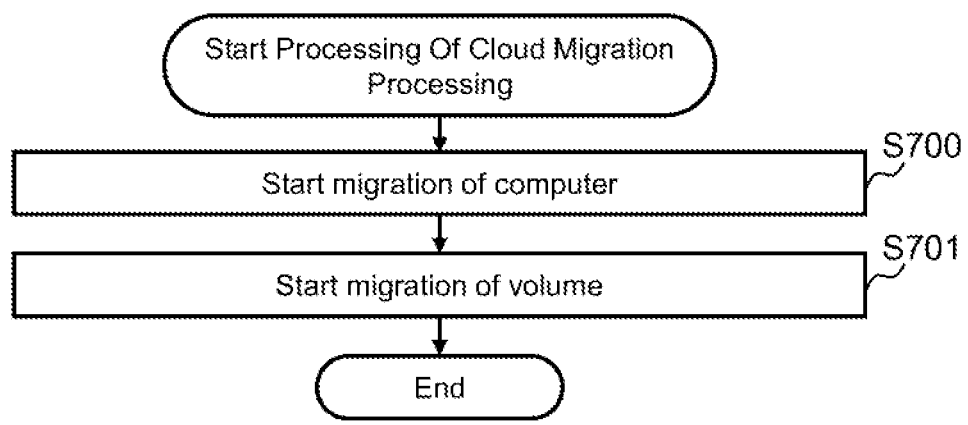
FIG. 7 is a diagram showing a flow of the start processing of the cloud migration processing.

The start processing of the cloud migration processing (S600) is performed. Specifically, as shown in FIG. 7, the tool operating unit 151 receives the designation of the computer 101 and the volume to be migrated from a user (for example, operator of the information processing system 105), and then starts the cloud migration processing. Specifically, the tool operating unit 151 issues to a migration instruction to the cloud migration tool 190 designating the designated computer 101 and the designated volume. In response to the migration instruction, the cloud migration tool 190 starts the migration of the designated computer 101 as the computer instance 108 to the cloud computer service 107 (S700), and starts the migration of the designated volume to the cloud storage service 109 (S701). In this embodiment, all or a part of the data volumes 104 among one or more data volumes 104 recognized by the designated computer 101 is designated. Migration to the cloud storage service 109 of the system volume 103 may be performed in S700, or performed in S701. In S701 (migration of the volume), the designated data volume 104, and the system volume 103 recognized by the computer 101 to be migrated, are migrated. In S701, the volume in the first storage system 102 is the migration source, and the volume in the cloud storage service 109 may be the migration destination. For example, the intermediate volume 111 is prepared in the cloud storage service 109 for each designated data volume 104, and the migration of data from the data volume 104 to the intermediate volume 111 is started. S700 and S701 may also be performed in parallel. Moreover, the tool operating unit 151 may add the information of the designated computer 101 to the foregoing computer migration management information in the management information 140 (migration status of the computer 101 is "migration start"). Moreover, the tool operating unit 151 may add the information of the volume to be migrated to the foregoing volume migration management information in the management information 140 (migration status of the volume is "migration start"). Moreover, the tool operating unit 151 may add the information of the intermediate volume 111 of the migration destination to the foregoing intermediate volume management information in the management information 140 (migration status of the intermediate volume is "creation standby").

Figure 8:
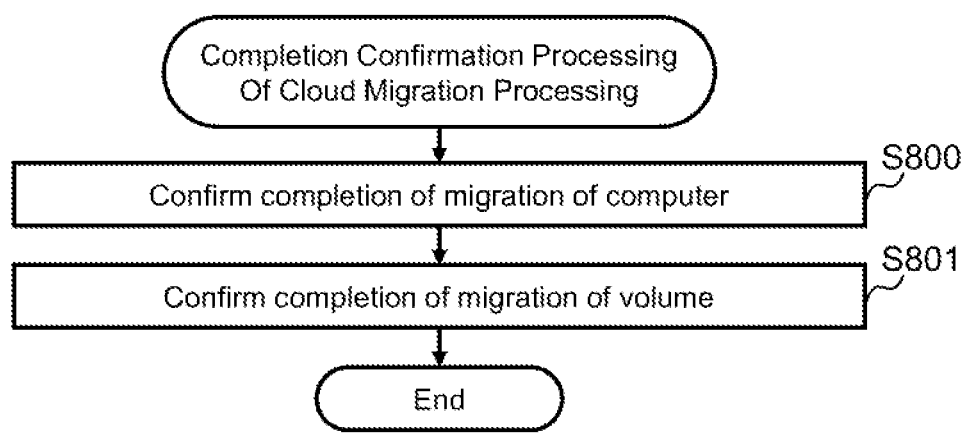
FIG. 8 is a diagram showing a flow of the completion confirmation processing of the cloud migration processing.

Thereafter, as shown in FIG. 6, the completion confirmation processing of the cloud migration processing (S601) is performed. Specifically, as shown in FIG. 8, the migration completion confirmation unit 152 confirms the completion of migration of the computer 101 to be migrated (that the computer 101 has been migrated as the computer instance 108 to the cloud computer service 107) (S800), and additionally confirms the completion of migration of the designated volume (that the volume has been migrated to the cloud storage service 109) (S801) by communicating with the cloud migration tool 190. S800 and S801 may also be performed in parallel. The migration completion confirmation unit 152 may update the management information 140 (for example, migration status of the computer 101 may be updated to "migration complete", migration status of the volume may be updated to "migration complete", and migration status of the intermediate volume 111 may be updated to "creation complete", respectively).

After the completion of the cloud migration processing is confirmed, the migration control unit 153 may cause the intermediate volume 111 to become an online status (S602). Specifically, for example, depending on the cloud migration tool 190, a path for connecting the created intermediate volume 111 and the computer instance 108 may be provided, and the migration control unit 153 may cause this path to be an online status. Nevertheless, S602 is an option, and S602 is not performed in this embodiment.

Figure 9:
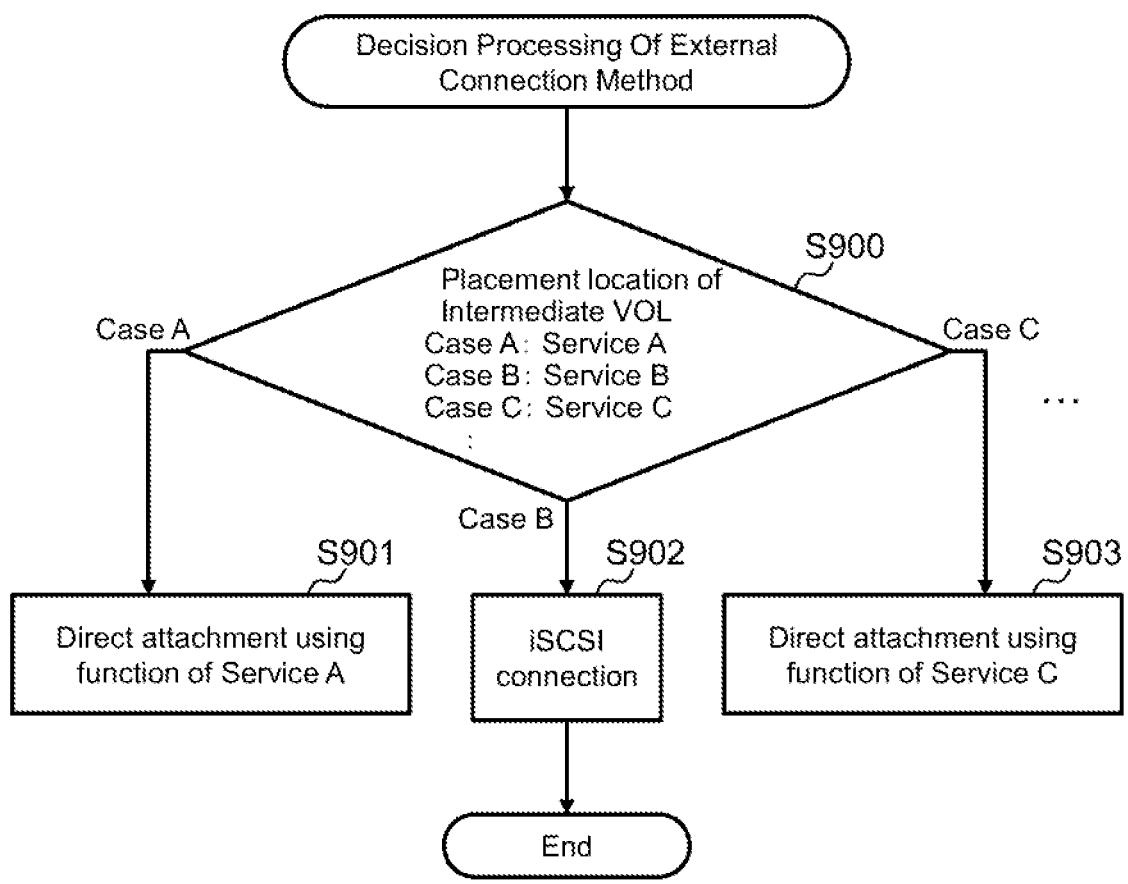
FIG. 9 is a diagram showing a flow of the decision processing of the external connection method.

After the completion of the cloud migration processing is confirmed, the migration control unit 153 performs the decision processing of the external connection method (S603). For example, as shown in FIG. 9, the migration control unit 153 determines a placement location of the intermediate volume 111 (S900), and decides the external connection method according to the determined location. The management information 140 may include external connection management information (information including the identifying information of the location for each location where the intermediate volume 111 is placed (for example, cloud storage service) and the information representing the external connection method), and the migration control unit 153 may perform S900 by referring to the external connection management information.

According to the example shown in FIG. 9, when the placement location is cloud storage service A, the migration control unit 153 uses the function equipped in cloud storage service A and decides the external connection method for directly attaching the intermediate volume 111 to a prescribed instance in the second storage system 112 (S901). When the placement location is cloud storage service B, the migration control unit 153 decides an iSCSI connection as the external connection method to the second storage system 112 of the intermediate volume 111 (S902). When the placement location is cloud storage service C, the migration control unit 153 uses the function equipped in cloud storage service C and decides the external connection method for directly attaching the intermediate volume 111 to a prescribed instance in the second storage system 112 (S903). While an external connection to the second storage system 112 of the intermediate volume 111 is required for the virtualization of the intermediate volume 111 (creation of the mapping volume 113), since the external connection depends on the placement location of the intermediate volume 111, the intermediate volume 111 can be externally connected to the second storage system 112 with a proper external connection method according to the placement location of the intermediate volume based on the processing shown in FIG. 9. The term "placement location" used in the explanation made with reference to FIG. 9 may also be referred to as the "type of cloud environment in which the intermediate volume is placed" or the "type of cloud storage service in which the intermediate volume is placed".

As shown in FIG. 6, the migration control unit 153 causes the second storage system 112 to execute the external connection according to the external connection method decided in S603 (S604). The second storage system 112 can thereby externally connect the intermediate volume 111 to the second storage system 112.

Next, the migration control unit 153 causes the second storage system 112 to execute the virtualization of the externally connected intermediate volume 111 (S605). The second storage system 112 can thereby create the mapping volume 113, a volume in which the intermediate volume 111 is virtualized, in the second storage system 112.

Figure 10:
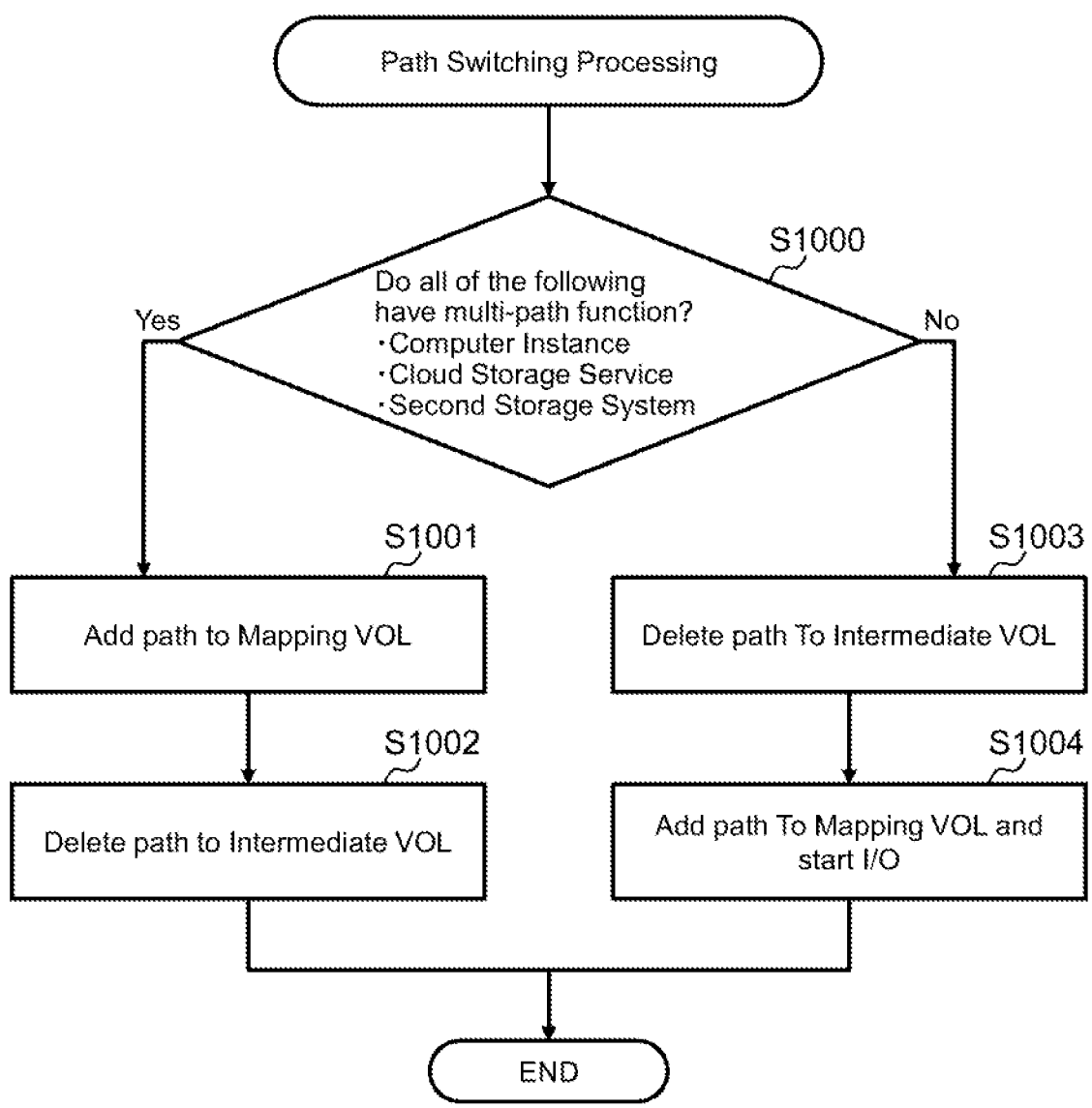
FIG. 10 is a diagram showing a flow of the path switching processing.

Next, the path switching processing is performed (S606). Specifically, as shown in FIG. 10, the migration control unit 153 determines whether the computer instance 108, the cloud storage service 109 and the second storage system 112 all have a multipath function (S1000). For example, the management information 140 may include information representing whether the computer instance 108, the cloud storage service 109 and the second storage system 112 respectively have a multipath function, and the determination of S1000 may be performed based on the management information 140. Moreover, a "multipath function" is a function in which a plurality of paths is permitted regarding one piece of volume identifying information (for example, each of the plurality of paths is a path in an online status) and one path among such plurality of paths is selected and used. A "path in an online status" is a path that can be used for sending an I/O request.

When the result of the determination of S1000 is true (S1000: YES), since a multipath is permitted, the migration control unit 153 adds a path which connects the computer instance 108 and the mapping volume 113 (for example, issues an instruction for adding the path to at least either the computer instance 108 or the second storage system 112) (S1001). A path which connects the computer instance 108 and the mapping volume 113 is thereby added. Thereafter, the migration control unit 153 deletes a path which connects the computer instance 108 and the intermediate volume 111 (for example, issues an instruction for adding the path to at least either the computer instance 108 or the second storage system 112) (S1002). A path which connects the computer instance 108 and the intermediate volume 111 is thereby deleted. When the I/O of data has been started via a path which connects the computer instance 108 and the intermediate volume 111 before the path switching processing, the I/O of data can be performed via either the foregoing path, or the path added in S1001. In cases where the I/O of data has not been started via a path which connects the computer instance 108 and the intermediate volume 111 before the path switching processing, when a path is added in S1001, the migration control unit 153 may instruct the computer instance 108 and the second storage system 112 to start the I/O of data via the added path. When a path which connects the computer instance 108 and the intermediate volume 111 has not been provided before the path switching processing, S1002 is skipped.

When the result of the determination of S1000 is false (S1000: NO), since a multipath is not permitted, the migration control unit 153 deletes a path which connects the computer instance 108 and the intermediate volume 111 (S1003). Thereafter, the migration control unit 153 adds a path which connects the computer instance 108 and the mapping volume 113, and causes the path to become an online status (S1004). A path which connects the computer instance 108 and the mapping volume 113 is thereby added, and the I/O of data is started via the added path. Note that, in cases where a path which connects the computer instance 108 and the intermediate volume 111 has not been provided before the path switching processing, S1003 is skipped.

As described above, proper path addition and proper path deletion are enabled according to whether or not a multipath has been permitted.

Moreover, when a multipath has not been permitted, S1003 is required before S1004. Thus, when the I/O of data is started via a path to and from the intermediate volume 111, the processing of stopping such I/O is required. In this embodiment, since the I/O of data to and from the intermediate volume 111 is not started, the processing of stopping the I/O is not required.

Note that, when it is known in advance that a multipath has been permitted (for example, among S1000 to S1004, S1000, S1003 and S1004 are constantly not required), the I/O of data may be started via a path to the intermediate volume 111 before the mapping volume 113 is created. This is because the processing of stopping the I/O is not required.

After the path switching processing (S606), as shown in FIG. 6, the migration control unit 153 causes the second storage system 112 to start the migration of data from the mapping volume 113 to the target volume 114 (S607). The second storage system 112 thereby starts the migration of data from the mapping volume 113 to the target volume 114. Note that the target volume 114 may be a volume created in the second storage system 112 in response to an instruction from the migration control unit 153, or a volume designated by the migration control unit 153 among a plurality of volumes in the second storage system 112. Moreover, as described above, when the second storage system 112 receives an I/O request from the computer instance 108 during the foregoing migration, the I/O of data is performed to and from the mapping volume 113 or the data volume 104 according to the I/O request. The I/O of data to and from the mapping volume 113 is actually performed to the intermediate volume 111. Moreover, in S607, the migration control unit 153 may also update the management information 140 (for example, migration status of the intermediate volume 111 may be "migration start").

The migration control unit 153 confirms the completion of the migration of data from the mapping volume 113 to the data volume 104 (S608). For example, the migration control unit 153 receives a migration complete notice from the second storage system 112. In S608, the migration control unit 153 may also update the management information 140 (for example, migration status of the intermediate volume 111 may be "migration complete").

The migration control unit 153 causes the second storage system 112 to execute the cancellation of the external connection based on the external connection method decided in S603 (S610). The second storage system 112 thereby cancels the external connection to the second storage system 112 of the intermediate volume 111.

The migration control unit 153 causes the cloud storage service 109 to execute the deletion of the intermediate volume 111 in which the migration of data has been completed (S611). The cloud storage service 109 thereby deletes the intermediate volume 111. It is thereby possible to avoid the wasteful consumption of resources of the cloud storage service 109. In S611, the migration control unit 153 may also update the management information 140 (for example, migration status of the intermediate volume 111 may be "deletion start or deletion complete").

The migration control unit 153 may also cause the first storage system 102 to execute the deletion of the data volume (source volume) 104 (S612).

Moreover, in cases where the second storage system 112 comprises a processing logic of executing at least a part of the series of processes (for example, external connection of the intermediate volume 111, creation of the mapping volume 113, and migration of data from the mapping volume 113 to the target volume 114) after confirming the completion of the cloud migration processing, and the migration control unit 153 issues an instruction designating the necessary parameters (for example, identifying information of the intermediate volume, identifying information of the target volume 114) to the processing logic, at least a part of the series of processes described above may be automatically performed.

Second Embodiment

The second embodiment is now explained. In the following explanation, differences in comparison to the first embodiment will be mainly explained, and the explanation of points that are common with the first embodiment will be omitted or simplified. Note that this point is also the same in the third embodiment and other subsequent embodiments described below.

Figure 11:
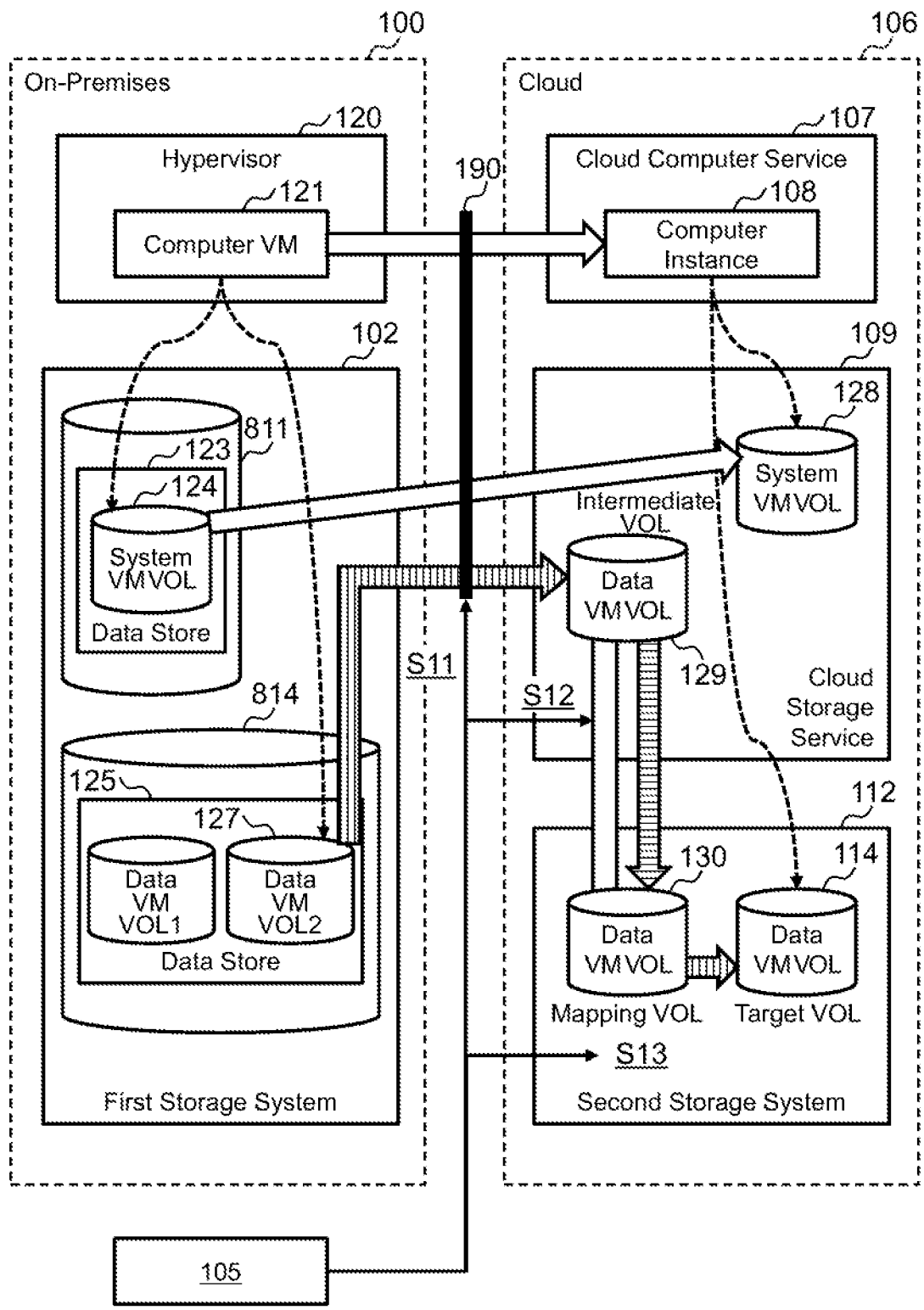
FIG. 11 is a diagram showing an overview of the system migration according to the second embodiment.

FIG. 11 is a diagram showing an overview of the system migration according to the second embodiment.

In the on-premises environment 100, a hypervisor 120, a system in which a computer is virtualized, is executed in a physical system (for example, physical computer). The hypervisor 120 executes a computer VM (virtual machine) 121 as a virtualized computer.

As volumes provided by the first storage system 102, for example, there are volumes 811 and 814.

In the volume 811, a data store 123 for the hypervisor 120 (for example, file system space that can be interpreted by the hypervisor) is created, for example, by the hypervisor 120. The data store 123 stores a system VM volume 124, which is a system volume recognized by the computer VM 121.

A data store 125 for the hypervisor 120 is also created in the volume 814. A data VM volume 127 as a data volume recognized by the computer VM 121 is stored in the data store 125. A plurality of data VM volumes 127 may exist in one data store 125. The I/O of data from the computer VM 121 to the data VM volume 127 is performed via the hypervisor 120 and, therefore, data exists in the data VM volume 127 based on a data placement that can be interpreted by the hypervisor 120. A "VM volume" is a virtual disk as a block device viewed from the computer VM 121. A "data store" is a storage area of the VM volume.

As described above, when a computer is the computer VM 121, while the I/O of data is performed to the VM volume (VM volume in the data store) via the hypervisor 120, the data placement in the VM volume is for the hypervisor 120. In other words, the placement of the VM volume and the data placement of the VM volume (data in the VM volume) cannot be interpreted without the hypervisor 120.

According to the comparative example based on NPTL 1, considered may be using the foregoing remote copy function (in other words, without going through the cloud storage service 109), and migrating the volume 814 from the first storage system 102 to the second storage system 112. Nevertheless, when the cloud computer service 107 does not have the same hypervisor 120 as the on-premises environment 100, there are no means for interpreting the data structure as the data store in the volume migrated to the second storage system 112, placement of the VM volume, and data placement of the VM volume. Accordingly, the data placement of the VM volume migrated to the second storage system 112 cannot be interpreted by the computer instance 108 in the cloud computer service 107. In other words, it is not possible to migrate data while maintaining a state in which the computer instance 108 is able to interpret the VM volume.

Moreover, according to the comparative example based on NPTL 1, the remote copy function performs the migration in volume units recognized by the storage system. Thus, when there is a plurality of data VM volumes 127 in the volume 814 provided by the first storage system 102, all of the plurality of data VM volumes 127 is migrated. In other words, data cannot be migrated in data VM volume units.

Moreover, according to the comparative example based on NPTL 2, migration is performed using the remote copy function after changing the data storage format in the on-premises environment 100 before migration to the cloud environment 106. In changing the data storage format, data stored in the data VM volume 127 is coped to the volume provided by the first storage system 102 (volume for which the data store 125 has not been created). Based on this change of the data storage format, the computer VM121 can interpret the data VM volume (copy destination volume) without having to go through the hypervisor 120. Subsequently, the data VM volume (copy destination volume) is migrated to the second storage system 112 based on the foregoing remote copy function. Since the computer VM121 is able to interpret the data VM volume (copy destination volume) in the on-premises environment 100 without the hypervisor 120, the computer instance 108 can interpret the data VM volume even after it is migrated to the second storage system 112. Nevertheless, when changing the data storage format in the on-premises environment 100, since an additional area is used for the data copy (since additional storage capacity for the copy destination volume is required), migration cannot be performed unless there is sufficient free space in the first storage system 102.

In this embodiment, the data VM volume (and system VM volume) is migrated to the cloud storage service 109 by the cloud migration tool 190. The cloud migration tool 190 converts a data placement in the VM volume into a data placement that can be interpreted by the computer instance 108 and migrates the VM volume to the cloud storage service 109. Thus, the data placement of the system VM volume 128 migrated to the cloud storage service 109 of the system VM volume 124 can be interpreted by the computer instance 108 even without the hypervisor 120. Similarly, the data placement of the data VM volume 129 migrated to the cloud storage service 109 of the data VM volume 127 can be interpreted by the computer instance 108 even without the hypervisor 120. This data VM volume 129 is the intermediate volume, is virtualized by the second storage system 112, and data is migrated from the mapping volume 130 (volume in which the data VM volume 129 is virtualized) to the target volume 114. Consequently, the data placement of the target volume 114 can be interpreted by the computer instance 108.

Moreover, the volumes migrated by the cloud migration tool 190 are units recognized by the computer VM 121. Thus, even if a plurality of data VM volumes 127 exists in the volume 814, data can be migrated to the cloud storage service 109 in VM volume units. In other words, certain data VM volumes 127 among the plurality of data VM volumes 127 in one volume 814 can be migrated to the second storage system 112 via the cloud storage service 109. To put it differently, the remaining data VM volumes 127 among the plurality of data VM volumes 127 in one volume 814 may be excluded from being migrated.

Moreover, while the area of the cloud storage service 109 is used as the data VM volume (intermediate volume) 129 during the migration, since the cloud environment has excess resources unlike the on-premises environment with limited resources, there is no substantial problem with the capacity for the data VM volume (intermediate volume) 129 being required in the cloud environment.

Third Embodiment

Figure 12:
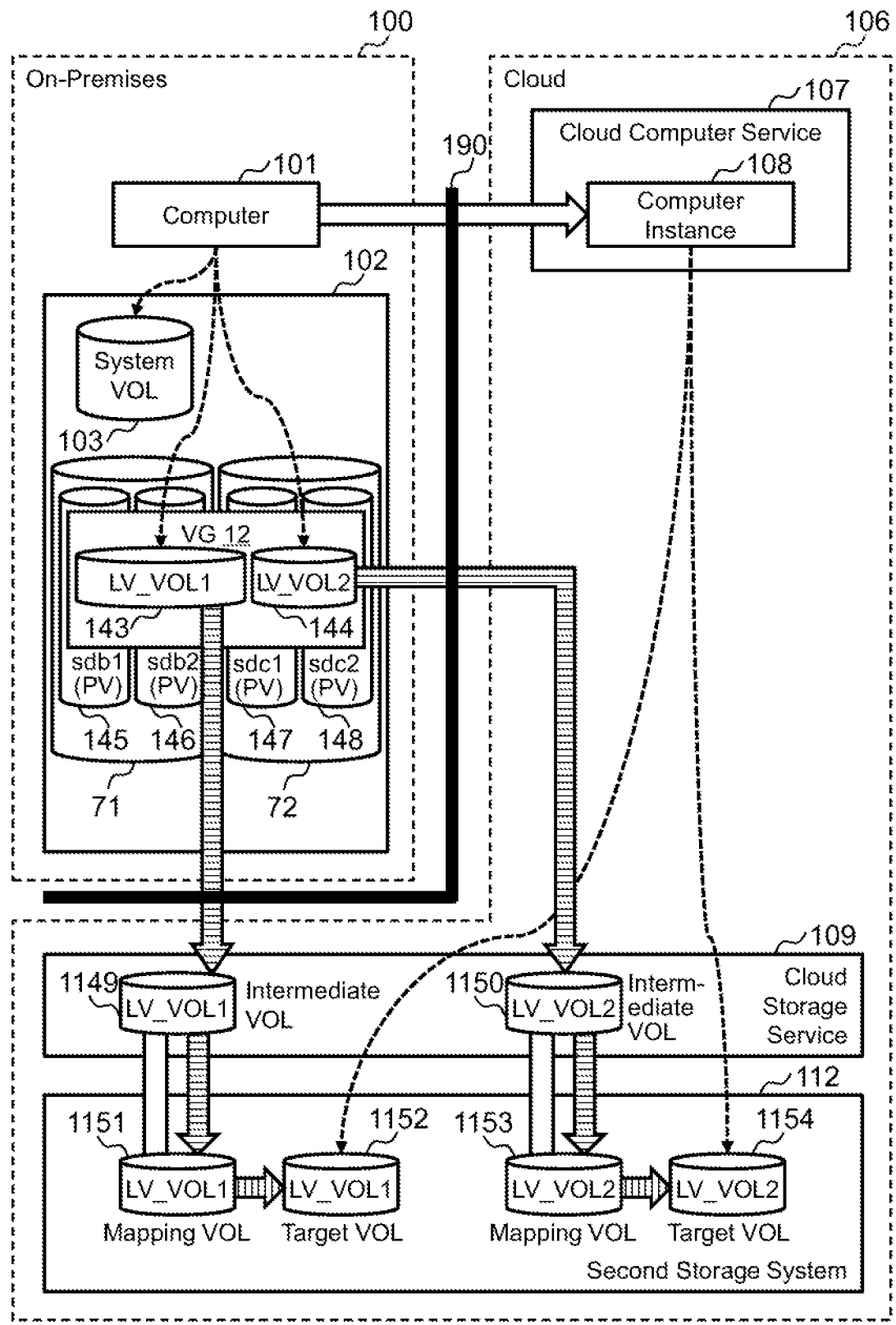
FIG. 12 is a diagram showing an overview of the system migration according to the third embodiment.

FIG. 12 is a diagram showing an overview of the system migration according to the third embodiment. Note that, due to limitations of space, illustration of the information processing system 105 is omitted in FIG. 12.

In the third embodiment, virtualization is performed in a layer that is different from the second embodiment. In other words, while virtualization is performed in the hypervisor 120 in the second embodiment, virtualization is performed in the OS (Operating System) of the computer 101 in the third embodiment. For example, an LVM (Logical Volume Manager) is executed in the computer 101. An LVM is an example of an element that performs virtualization. A volume in the first storage system 102 recognized by the computer 101 is virtualized based on the LVM function.

According to an LVM, as the volumes in the first storage system 102, there are a physical volume (PV) and a logical volume (LV).

The physical volume is all or a part of the storage space provided by the physical storage device. In other words, one or more physical volumes are provided from the physical storage device. According to the example shown in FIG. 12, there is a plurality of physical volumes 145, 146, 147 and 148.

According to the example shown in FIG. 12, the volumes 71 and 72 are each a volume as a unit recognized by the storage system. For example, when the volume 71 is being recognized by the computer 101 as "sdb", the physical volumes 145 and 146 are storage spaces (devices) "sdb1" and "sdb2" obtained by the volume 71 being partitioned. These physical volumes 145 and 146 are used in the LVM.

As an aggregate of one or more physical volumes, a volume group (VG) is generated by the LVM. According to the example shown in FIG. 12, a volume group 12 is generated from the physical volumes 145 to 148.

A logical volume is all or a part of the storage space as a volume group. In other words, one or more logical volumes are provided from a volume group by the LVM. According to the example shown in FIG. 12, logical volumes 143 and 144 are provided from the volume group 12.

While the computer 101 is a physical computer in this embodiment, it may also be the computer VM described above. In other words, the third embodiment may also be combined with the second embodiment. The computer 101 respectively recognizes the logical volumes 143 and 144.

According to the comparative example, when migrating a logical volume, processing such as stopping of the I/O of data to the mount points of the logical volumes 143 and 144 in the first storage system 102, unmounting of the mount points of the logical volumes 143 and 144 from the first storage system 102, disablement of the volume group 12, export of the volume group 12, migration between storage systems in volume units of the volumes 71 and 72 configuring the exported volume group (migration using the foregoing remote copy function), import of the volume group 12 to the second storage system 112 (configuration of the volume group 12 configured with the migrated volumes 71 and 72), enablement of the volume group 12, mounting of the logical volumes 143 and 144, and starting of the I/O of data to the logical volumes 143 and 144 is performed. In the foregoing case, the problem is the time required for stopping the I/O of data.

Moreover, according to the comparative example, volumes will be migrated in the respective units of the volumes 71 and 72. In other words, migration cannot be performed in logical volume units.

In this embodiment, the volumes migrated by the cloud migration tool 190 are the units recognized by the computer 101. Thus, even if a plurality of logical volumes is provided from the volume group 12, migration to the cloud storage service 109 is possible in logical volume units. In other words, certain logical volumes among the plurality of logical volumes provided from one volume group 12 can be migrated to the second storage system 112 via the cloud storage service 109. To put it differently, the remaining logical volumes among the plurality of logical volumes provided from one volume group 12 may be excluded from being migrated.

Moreover, since migration in logical volume units is possible in this embodiment, it is not necessary to stop the I/O of data.

According to the example shown in FIG. 12, the following migration is performed.

The logical volume 143 is migrated as an intermediate volume 1149 to the cloud storage service 109, a mapping volume 1151, a volume in which the intermediate volume 1149 is virtualized, is created, and data is migrated from the mapping volume 1151 in an online status to a target volume 1152.

The logical volume 144 is migrated as an intermediate volume 1150 to the cloud storage service 109, a mapping volume 1153, a volume in which the intermediate volume 1150 is virtualized, is created, and data is migrated from the mapping volume 1153 in an online status to a target volume 1154.

Fourth Embodiment

Figure 13:
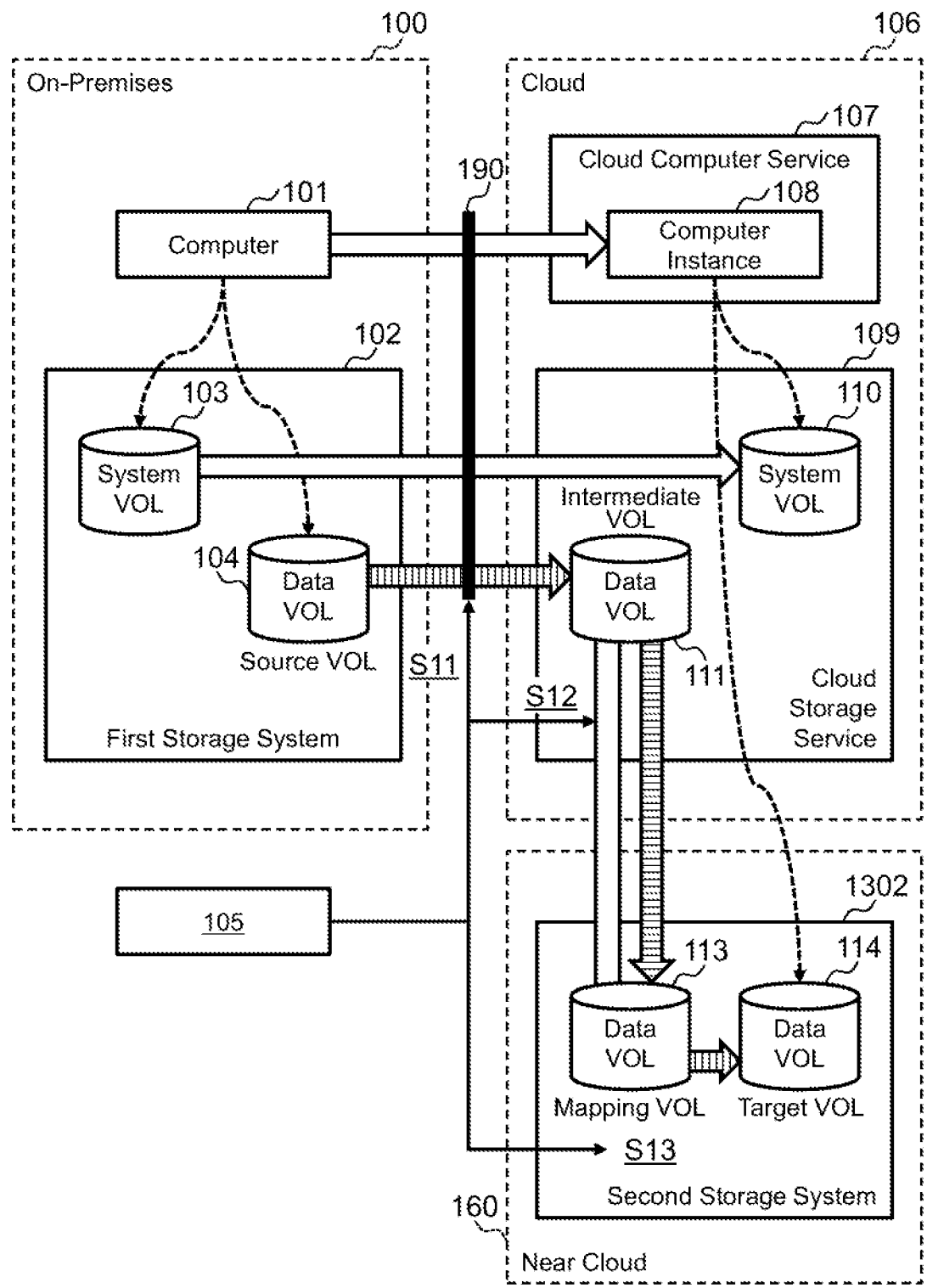
FIG. 13 is a diagram showing an overview of the system migration according to the fourth embodiment.

FIG. 13 is a diagram showing an overview of the system migration according to the fourth embodiment.

In the fourth embodiment, a second storage system 1302 is a storage system in a near cloud environment 160. A "near cloud environment" is an environment (for example, data center) connected to the cloud environment 106 via a dedicated line (for example, high-speed line) and, therefore, the name of "near cloud" is used in the explanation of this embodiment for the sake of convenience. The present invention can also be applied to this kind of second storage system 1302.

Fifth Embodiment

Figure 14:
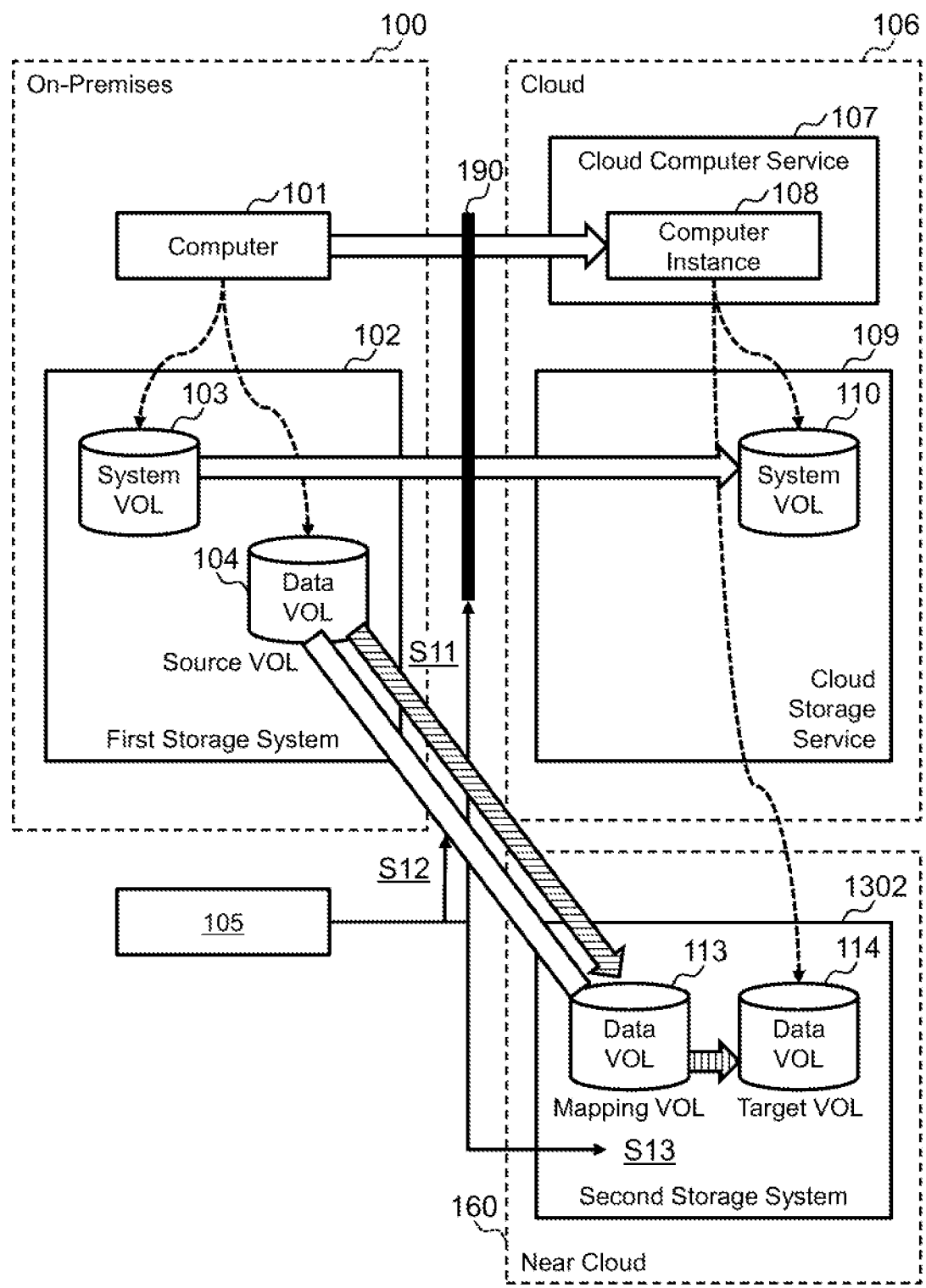
FIG. 14 is a diagram showing an overview of the system migration according to the fifth embodiment.

FIG. 14 is a diagram showing an overview of the system migration according to the fifth embodiment.

In the fifth embodiment, the data volume 104 of the on-premises environment 100 is migrated to the second storage system 1302 of the near cloud environment 160 without going through an intermediate volume. The timing of starting the I/O of data of the computer instance 108 may also be managed by using the computer migration management information and the volume migration management information described above.

In this embodiment, migration from the source volume (data volume) 104 of the first storage system 102 to the target volume 114 of the second storage system 1302 is realized without the remote copy function of copying data from the first storage system 102 to the second storage system 1302. Thus, even if the first storage system 102 has no compatibility with the second storage system 1302, the data volume 104 in the first storage system 102 cam be migrated to the second storage system 1302 with superior reliability or function in comparison to the default cloud storage service 109. Moreover, since the data volume 104 of the on-premises environment 100 is migrated to the second storage system 1302 of the near cloud environment 160 without going through an intermediate volume, reduction in the time required for the migration and improvement in the reliability of the migration can be expected.

Sixth Embodiment

Figure 15:
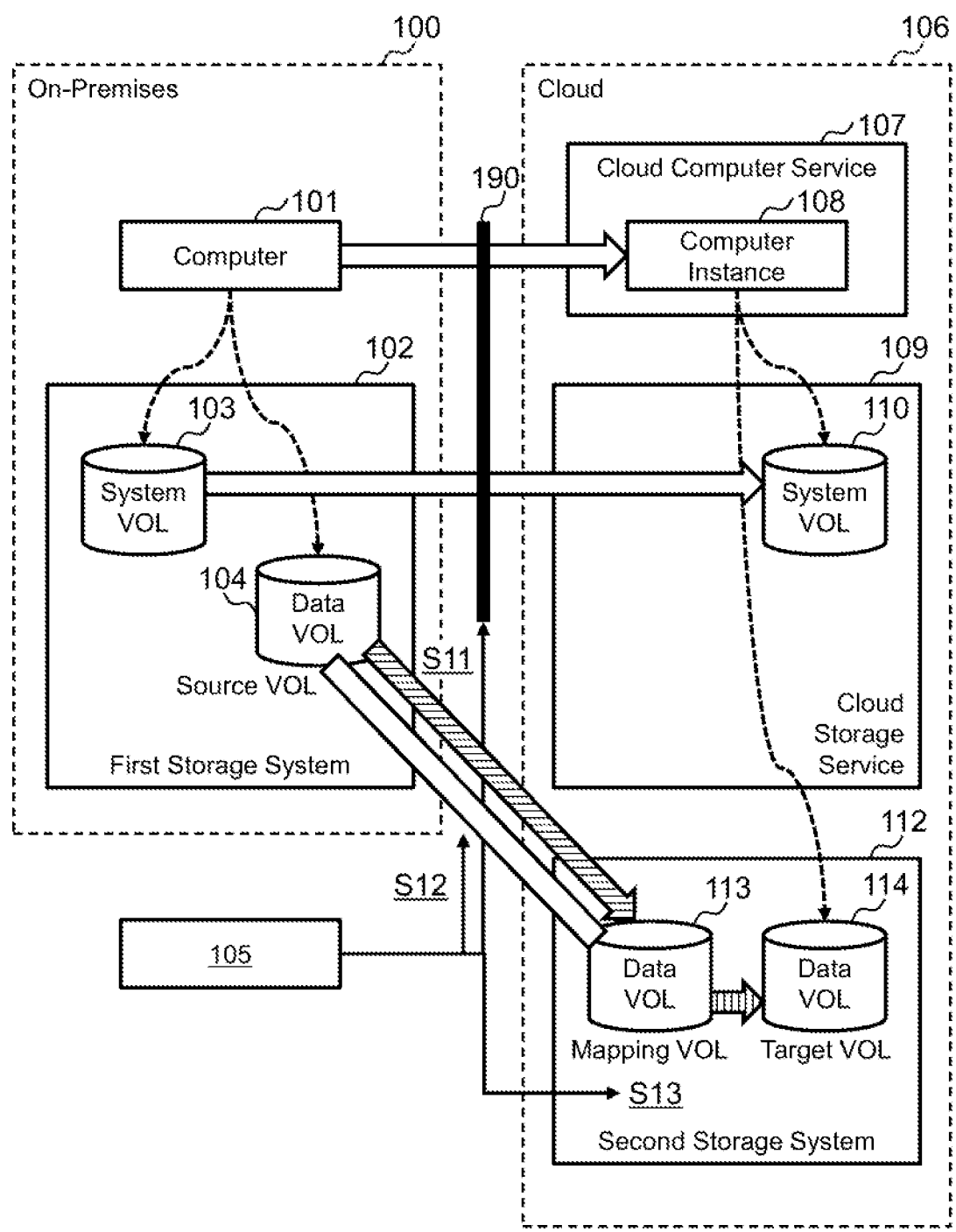
FIG. 15 is a diagram showing an overview of the system migration according to the sixth embodiment.

FIG. 15 is a diagram showing an overview of the system migration according to the sixth embodiment.

In the sixth embodiment, the data volume 104 of the on-premises environment 100 is migrated to the second storage system 112 of the cloud environment 106 without going through an intermediate volume. The timing of starting the I/O of data of the computer instance 108 may also be managed by using the computer migration management information and the volume migration management information described above.

In this embodiment, the same effect as the fifth embodiment can be expected.

Seventh Embodiment

Figure 16:
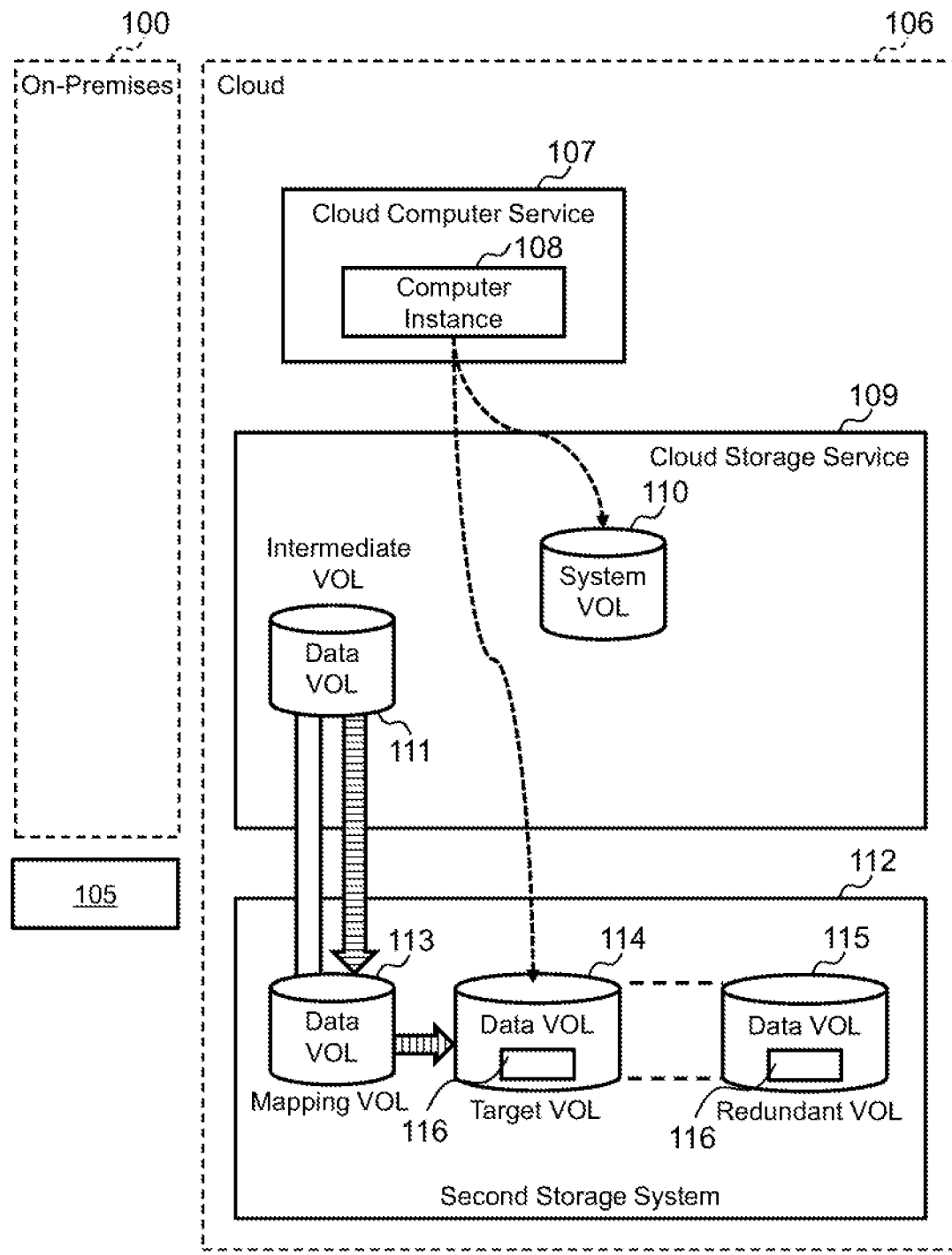
FIG. 16 is a diagram showing an overview of the system migration according to the seventh embodiment.

FIG. 16 is a diagram showing an overview of the system migration according to the seventh embodiment. Note that, due to the limitation of page space, illustrations of the on-premises environment 100, the cloud migration tool 190, and the information processing system 105 have been omitted in FIG. 16.

In the seventh embodiment, when migrating data to the target volume 114 of the second storage system 112, the second storage system 112 adds storage control data 116 to the data that is to be migrated to the target volume 114, and redundantly stores the data to be migrated and the added storage control data 116. For example, the second storage system 112 creates a redundant volume 115 of the target volume 114. Data in the target volume 114 and the redundant data (for example, replicated data) of the storage control data 116 are stored in the redundant volume 115. Note that the term "data to be migrated" used in this paragraph may be all data to be migrated to the target volume 114 or data in a unit of a prescribed size.

The storage control data 116 is data that is used in the control of the second storage system 112. As an example of the storage control data 116, there is a consistency check code. A consistency check code is a value that is assigned to data for detecting whether there is any deficiency or error in the data upon the transfer, storage or reading of data. A consistency check code is, for example, an ECC (Error Correcting Code).

In substitute for or in addition to a consistency check code, management data for realizing storage functions (for example, thin provisioning, hierarchy control, snapshot, compression, deduplication, remote copy, etc.) may also be added as the storage control data 116.

While FIG. 16 illustrates an example of redundant storage where the data of the target volume 114 has been duplicated, the redundancy level may also be triplication or more, or Erasure Coding. The size of the redundant volume 115 may also be different from the size of the target volume 114.

Figure 17:
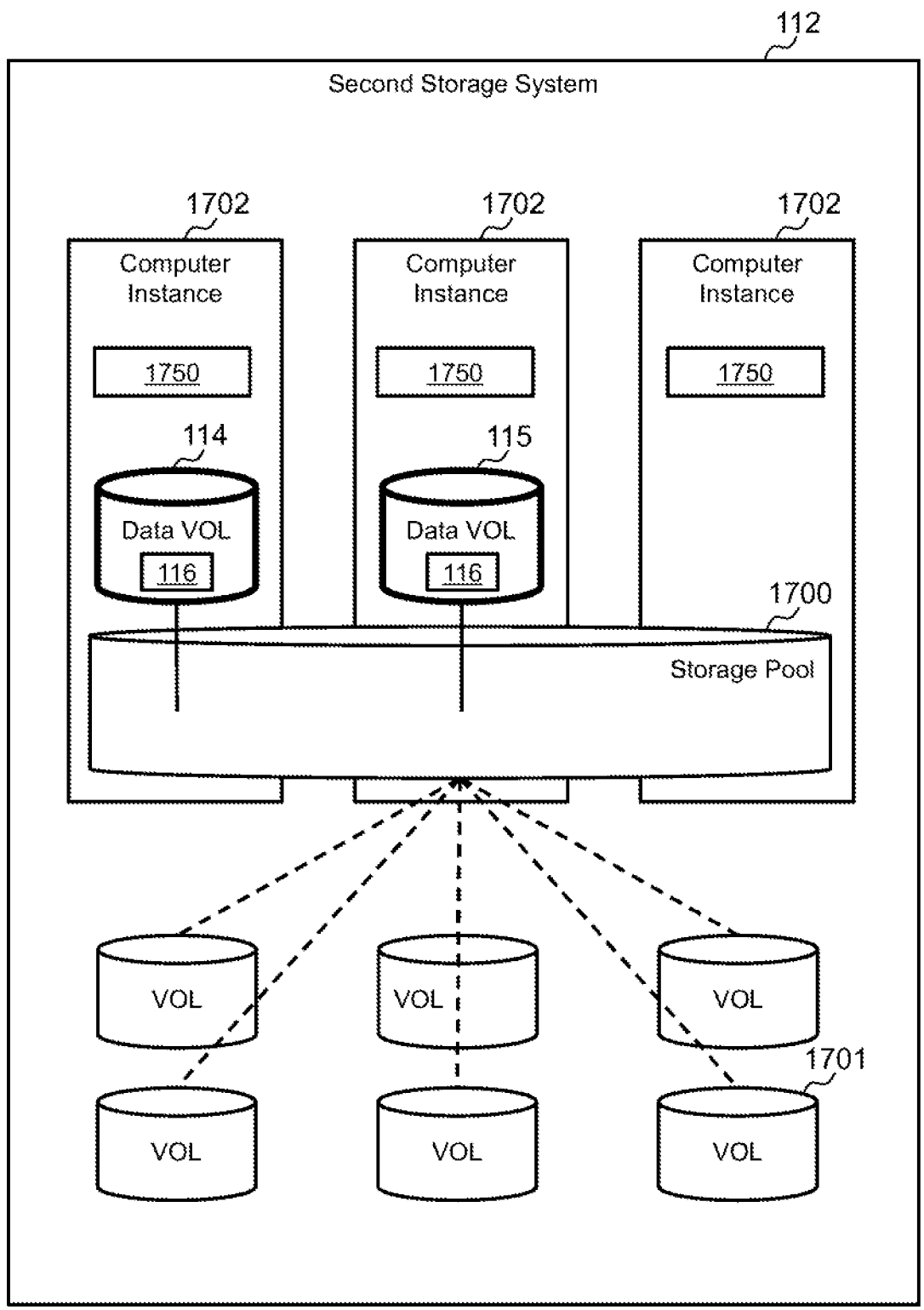
FIG. 17 is a diagram showing a configuration of the second storage system according to the seventh embodiment.

FIG. 17 is a diagram showing a configuration of the second storage system 112.

The second storage system 112 has a portion of the computer instances 1702 provided from the cloud computer service 107 and a portion of the volumes 1701 (indicated as "VOL" in FIG. 17) provided from the cloud storage service 109. The computer instances 1702 are configured from one or more computer instances. While the computer instance 1702 in the second storage system 112 has control software 1750, the application does not need to be operated (meanwhile, the migrated computer instance may have an application). The volumes 1701 are configured from one or more volumes.

The configuration shown in FIG. 17 is merely an example, and the number of computer instances 1702 and the number of volumes 1701 may be different from those illustrated in FIG. 17. Moreover, the second storage system 112 may be configured only from the computer instance 1702, or have one or more other components provided by the cloud environment 106.

The control software 1750 runs on the computer instance 1702. The control software 1750 uses the volume 1701 of the second storage system 112 and forms a storage pool 1700. The storage pool 1700 may be a logical space (address space) based on one or more volumes 1701.

Moreover, the control software 1750 uses the storage pool 1700 and creates a target volume 114 and a redundant volume 115. In preparation for a failure, the target volume 114 and the redundant volume 115 are managed by different computer instances 1702. Specifically, the control software 1750 of the first computer instance 1702 may manage the target volume 114 associated with the storage pool 1700. The control software 1750 of the second computer instance 1702 may manage the redundant volume 115 associated with the storage pool 1700. The second computer instance 1702 is a computer instance that is different from the first computer instance 108. Consequently, even if a failure occurs in either the first computer instance 1702 or the second computer instance 1702, I/O can be continued to the volume 114 or the volume 115 that is being managed by the remaining computer instance (first computer instance 1702 or second computer instance 1702).

One computer instance among a plurality of computer instances 1702 is the master, and the control software 1750 of the master computer instance 1702 (hereinafter referred to as the "master control software 1750") may give instructions to the control software 1750 other than the master control software 1750 (control software 1750 of a computer instance 1702 other than the master computer instance 1702). The master control software 1750 and the control software 1750 that received instructions from the master control software 1750 may individually or jointly form the storage pool 1700, create the target volume 114 in the first computer instance 1702, or create the redundant volume 115 of the target volume 114 in the second computer instance 1702.

Eighth Embodiment

The eighth embodiment is now explained. The eighth embodiment is an embodiment in which the migration method is used properly according to the compatibility of the migration source storage system and the migration destination storage system. The system configuration of the eighth embodiment may be the same as the system configuration of the first embodiment to the seventh embodiment or the literature included in the Citation List.

Figure 18:
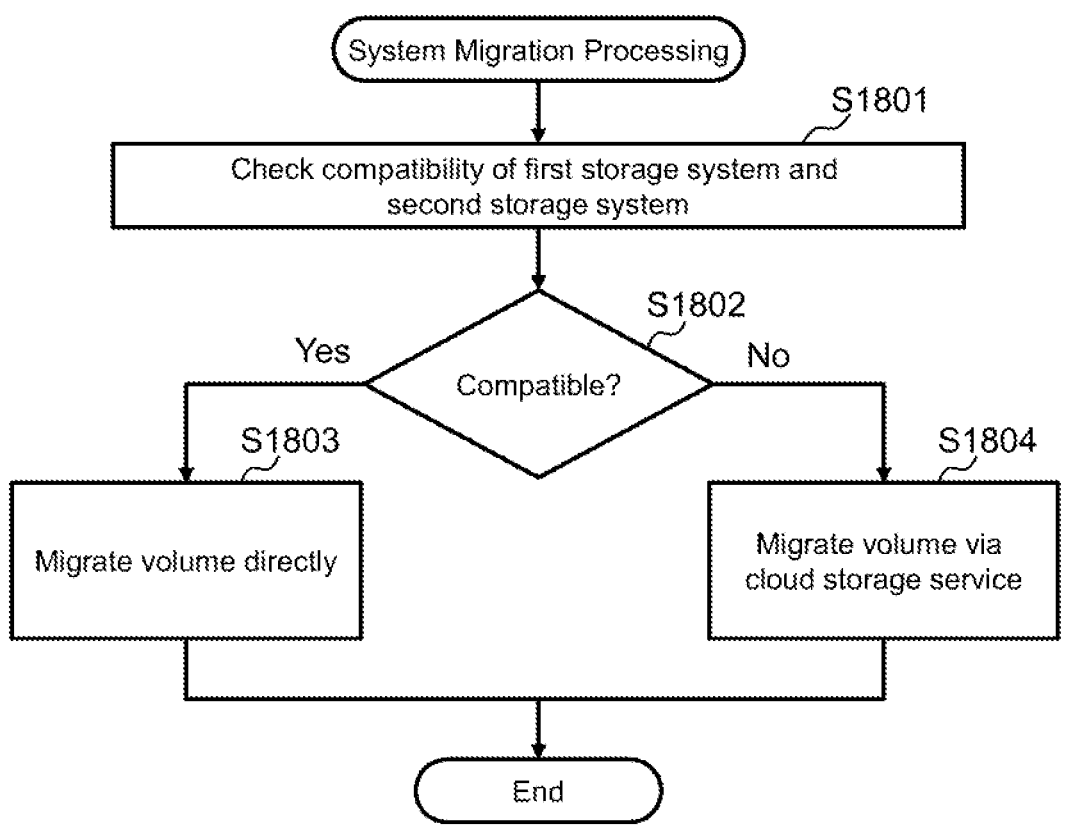
FIG. 18 is a diagram showing the flow of processing performed in the eighth embodiment.

FIG. 18 is a diagram showing the flow of processing performed in the eighth embodiment.

In the eighth embodiment, whether the first storage system 102 as the migration source and the second storage system 112 as the migration destination have compatibility is foremost checked (S1801). This check may be performed, for example, according to one of the following methods.

The information processing system 105 (for example, migration control unit 153) may collect system information (for example, information indicating the vendor and model of the storage system) from each of the first and second storage systems 102 and 112, and determine whether the system information of the first storage system 102 and the system information of the second storage system 112 satisfy the compatibility rules represented by the compatibility rule information. The compatibility rule information may be stored in the storage device 52 of the information processing system 105.

The user who checked the compatibility may, in advance, enter information representing whether or not there is compatibility in the information processing system 105, and store such information in the storage device 52. Subsequently, the information processing system 105 (for example, migration control unit 153) may perform S1801 based on the foregoing information.

When they have compatibility as a result of the check (S1802: Yes), the data volume is directly migrated from the first storage system 102 as the migration source and the second storage system 112 without going through the cloud storage service 109 (S1803). In other words, when they have compatibility, migration can be performed according to the method described in the literature of the Citation List.

When they have no compatibility as a result of the check (S1802: No), the data volume is migrated from the first storage system 102 as the migration source and the second storage system 112 by going through the cloud storage service 109 (S1804). In other words, the data volume is migrated according to the method described in the first embodiment to the seventh embodiment. When using the method of the fifth embodiment or the sixth embodiment, the data volume may also be migrated without going through the cloud storage service 109.

According to this embodiment, the appropriate migration method can be selected by checking the compatibility of the migration source storage system and the migration destination storage system.

While several embodiments have been explained above, these embodiments are illustrated for explaining the present invention, and are not intended to limit the scope of the present invention only to these embodiments. For example, two or more arbitrary embodiments among the first embodiment to the seventh embodiment described above may be combined. Moreover, a part or all of the processing based on an instruction of the information processing system 105 may be manually executed without going through an instruction of the information processing system 105. Moreover, the "cloud storage service" may also be referred to as "cloud storage" or a "cloud storage system".

Moreover, in the foregoing explanation, the volume to be migrated is a logical volume. As a general rule, data stored in a logical volume (data stored in a physical volume) is also transferred, together with the logical volume, between the physical volumes (drives) of the first storage system, the cloud storage service, and the second storage system. During the transfer of data, there are cases where a part of the data temporarily exists in the migration source, and the remaining data exists in the migration destination. Thus, for example, when the I/O request is a read request, data is read from the either the migration source or the migration destination, whichever contains the data to be read. Moreover, for example, when the I/O request is a write request, the data may be written in both the migration source and the migration destination. Data can thereby be accessed even during migration.

Moreover, the foregoing explanation can be summarized, for example, in the following manner. The following summary may include the supplementation of the foregoing explanation and the explanation of modified examples.

Constructed is an information processing system 105 including a processor 53 and communicable with a cloud computer, a first storage system 102 and a second storage system 112. When migrating a computer instance 108 as a computer 101 to the cloud computer and migrating data used by the computer instance 108 from the first storage system 102 to the second storage system 112, the information processing system 105 performs (A) and (B) below.

(A) Causes a migration tool 190 of the cloud computer to migrate, from the first storage system 102 to the cloud computer, a system volume 103 storing an image of an OS (Operating System) for configuring the computer instance to be migrated, and a data volume 104 storing data used by the OS.

(B) Creates a mapping volume 113, which has been mapped to an intermediate volume 111 as the data volume migrated to the cloud computer with the migration tool 190, in the second storage system 112, and sets a path of data input/output from the computer instance 108 to the mapping volume 113 in the computer instance 108.

(A) is performed by a tool operating unit 151. (B) is performed by a migration control unit 153. In (B), for example, a path is set by the computer instance 108 based on an instruction issued from the migration control unit 153. At least one of either (A) or (B) may be performed in response to a manual instruction to the information processing system 105, or performed automatically without such instruction.

The information processing system 105 further comprise a migration completion confirmation unit 152 which confirms that the migration by the migration tool 190 is complete. The migration control unit 153 may create the mapping volume 113 in the second storage system 112 after the completion of the migration by the migration tool 190 is confirmed.

The migration tool 190 may migrate the data volume 104 to the cloud computer based on a data placement that can be interpreted by the computer instance 108. The second storage system 112 may map an intermediate volume 111 as a data volume of the data placement that can be interpreted by the computer instance 108 to the mapping volume 113 in the second storage system. Moreover, the migration tool 190 may migrate, to the cloud computer, the data volume 104 by converting it into the data placement that can be interpreted by the computer instance.

The migration control unit 153 may migrate data from the mapping volume 113 of the second storage system 112 to a target volume 114 in the second storage system 112, and set a path in the target volume 114 in substitute for setting a path from the computer instance 108 to the mapping volume 113.

The migration control unit 153 may, after completing the migration of data from the mapping volume 113 to the target volume 114 in the second storage system 112, delete the intermediate volume 111 from the cloud computer.

The computer instance may use a plurality of data volumes in a migration source. The tool operating unit 151 may designate a plurality of data volumes used by the computer instance as data volumes to be migrated (for example, designation made made to the migration tool 190). Each of the designated data volume may be migrated to the cloud computer, and a mapping volume may thereby be created.

The migration control unit 153 may decide an an external connection method among a plurality of external connection methods according to the cloud computer which includes the data volume (intermediate volume 111), execute an external connection which associates the data volume (intermediate volume 111) with the second storage system according to the decided external connection method, and create, in the second storage system 112, the mapping volume 113 regarding the data volume (intermediate volume 111) of the externally connected cloud computer.

The migration control unit 153 may determine whether both the cloud computer and the second storage system 112 are compatible with a multipath function. When a result of the determination is true, the migration control unit 153 may add a path which connects the computer instance 108 and the mapping volume 113, and thereafter delete the path when there is a path which connects the data volume (intermediate volume 111) and the computer instance 108. When a result of the determination is false, the migration control unit 153 may delete a path which connects the data volume (intermediate volume 111) and the computer instance 108, and thereafter add a path which connects the computer instance 108 and the mapping volume 113. Note that the migration control unit 153 may cause the path to the mapping volume 113 to be an online status without causing the path to the data volume (intermediate volume 111) to be an online status.

The computer instance may operate on a virtual computer (for example, computer VM 121) generated by a hypervisor 120 executed by a physical computer (for example, computer 101) before migration. A data volume recognized by the computer instance may be a volume stored in a virtual disk as a data store 123 created by the hypervisor 120 and a volume recognized by the virtual computer. A data placement in the data volume may be a data placement for the hypervisor 120. The migration tool 190 may convert a data placement in the data volume into a data placement that can be interpreted by the computer instance and migrate the data volume to the cloud computer.

The computer instance may manage one or more logical volumes configuring a volume group 12 in the first storage system 122. The volume group may be one logical space configured from a plurality of physical volumes of the first storage system 102. The plurality of physical volumes may each be a logical space. A data volume recognized by the computer instance may be a logical volume recognized by the computer instance.

The cloud computer may include a compute function and a storage function, and may provide these functions as a cloud service. The compute function may be a function as the cloud computer service 107. The storage function may be a function as the cloud storage service 109. The second storage system 112 may be a storage service in a cloud environment which is separate from a cloud environment of the cloud service. Moreover, the second storage system 112 may be a storage system which is connected to the cloud computer of the cloud service.

Note that constructed may be an information processing system comprising, in substitute for or in addition to the information processing system 105, a cloud computer, a first storage system 102, and a second storage system 112. The cloud computer may include a compute function and a storage function. When migrating a computer instance to the cloud computer and migrating data used by the computer instance from the first storage system 102 to the second storage system 112, a migration tool 190 of the cloud computer may migrate, from the first storage system 102 to a storage function of the cloud computer, a system volume storing an image of an OS (Operating System) for the compute function to operate the computer instance to be migrated, and a data volume storing data used by the OS. The second storage system may create a mapping volume 130, which has been mapped to the data volume (intermediate volume 111) migrated to the cloud computer with the migration tool 190 of the cloud computer, in the second storage system 112, and set a path of data input/output from the computer instance 108 to the mapping volume 130 in the computer instance 108.

The invention claimed is:

1. An information processing system comprising
a communication interface that is communicatively coupled to:
  a first storage system at a first location,
  a cloud computer of a cloud computer service,
  a cloud storage system provided by a first cloud storage service, and
  a target storage system provided by a second cloud storage service, wherein the cloud storage system and the target storage system are different,
one or more processors that are communicatively coupled to the communication interface, wherein the one or more processors are collectively configured to:
  perform a migration of a computer instance of a virtual computer to the cloud computer, wherein the computer instance utilizes a system volume and a data volume and prior to the migration, the computer instance is in the first location, and the system volume and data volume are stored at the first location, wherein the migration is performed by:
    migrating the computer instance to the cloud computer,
    converting a first data placement of the data volume from the first storage system into a second data placement stored in the cloud storage system, wherein the second data placement can be interpreted by the computer instance directly without using a respective hypervisor of the cloud computer service,
    migrating the system volume and the data volume from the first storage system to the cloud storage system, wherein the first storage system and the target storage system have at least one incompatibility that prevents a remote copy of the data volume from the first storage system to the target storage system, and
    after the migrating of the data volume is complete:
      causing the target storage system to create a target volume, wherein the target volume is mapped to the data volume in the cloud storage system,
      setting a path of data input/output from the computer instance to the target volume, wherein the target volume maps to the data volume using the second data placement, setting the computer instance to access the system volume on the cloud storage system directly and prohibit direct utilization of the data volume on the cloud storage system, setting the computer instance to utilize the target volume on the target storage system and access data in the data volume on the cloud storage system by using the path between the computer instance and the target volume via a mapping between the target volume and the data volume on the cloud storage system, copying the data in the data volume in the cloud storage system to the target volume, after the copying of the data in the data volume is complete:

deleting the mapping from the target volume, and deleting the data volume in the cloud storage system while maintaining the system volume in the cloud storage system.

2. The information processing system according to claim 1, wherein the one or more processors are further collectively configured to:

migrate the data volume to the cloud storage system based on a data that can be interpreted by the computer instance; and wherein the target storage system is configured to map a respective data volume of the first data placement that can be interpreted by the computer instance to the target volume in the target storage system.

3. The information processing system according to claim 2, wherein the one or more processors are further collectively configured to:

migrate, to the cloud storage system, the data volume by converting the first data placement into the second data placement that can be interpreted by the computer instance.

4. The information processing system according to claim 1, wherein the one or more processors are further collectively configured to: set a respective path from the computer instance to the target volume.

5. The information processing system according to claim 1, wherein the one or more processors are further collectively configured to:

delete, from the cloud computer, an intermediate volume of the data volume that was migrated to the cloud storage system.

6. The information processing system according to claim 1, wherein the one or more processors are further collectively configured to:

designate a plurality of data volumes used by the computer instance as data volumes to be migrated; and each of the designated data volumes is migrated to the cloud storage system, and the target volume is thereby created.

7. The information processing system according to claim 1, wherein the one or more processors are further collectively configured to:

select an external connection method among a plurality of external connection methods according to the cloud storage system which includes the data volume, cause at least one of the cloud computer and the target storage system to execute an external connection which associates the data volume with the target storage system according to the external connection method, and cause the target storage system to create, in the target storage system, the target volume regarding the data volume of the cloud computer using the external connection method.

8. The information processing system according to claim 1, wherein the one or more processors are further collectively configured to:

determine whether each of the cloud computer, the cloud storage system and the target storage system are compatible with a multipath function;

when a result of the determination is true, add a path which connects the computer instance and the target volume, and thereafter delete the path when there is a path which connects an intermediate volume and the computer instance; and when a result of the determination is false, delete a path which connects the intermediate volume and the computer instance, and thereafter add a path which connects the computer instance and the target volume.

9. The information processing system according to claim 8, wherein the one or more processors are further collectively configured to:

cause a path to the target volume to be an online status without causing a path to the intermediate volume to be an online status.

10. The information processing system according to claim 1, wherein:

the data volume recognized by the computer instance is a volume stored in a virtual disk as a data store created by a particular hypervisor and a volume recognized by the virtual computer; and the first data placement in the data volume is a data placement for the particular hypervisor.

11. The information processing system according to claim 1, wherein:

the computer instance is configured to manage one or more logical volumes configuring a volume group in the first storage system;

the volume group is one logical space configured from a plurality of physical volumes of the first storage system;

the plurality of physical volumes is each a logical space; and the data volume recognized by the computer instance is a logical volume recognized by the computer instance.

12. The information processing system according to claim 1, wherein:

the target storage system is a storage system in a cloud environment which is separate from a cloud environment of a cloud service.

13. The information processing system according to claim 1, wherein:

the target storage system is a storage system which is connected to the cloud computer of a cloud service.

14. An information processing system comprising:

a virtual computer generated by a hypervisor executing on a physical computer located at a first location, wherein the physical computer is communicatively coupled to a first storage system that stores a system volume and a data volume that are utilized by the virtual computer;

a cloud computer of a cloud computer service;

a cloud storage system provided by a first cloud service;

a target storage system provided by a second cloud storage service, wherein the cloud storage system and the target storage system are different; and
a migration tool that includes a memory and one or more processors communicatively coupled to the memory, wherein the migration tool is configured to perform a migration of a computer instance of the virtual computer to the cloud computer,
wherein the migration is performed by:
migrating the computer instance to the cloud computer,
converting a first data placement of the data volume from the first storage system into a second data placement stored in the cloud storage system, wherein the second data placement can be interpreted by the computer instance without using a respective hypervisor of the cloud computer service,
migrating the system volume and the data volume from the first storage system to the cloud storage system, wherein the first storage system and the target storage system have at least one incompatibility that prevents a remote copy of the data volume from the first storage system to the target storage system, and
after the migrating of the data volume is complete:
creating a target volume, wherein the target volume is mapped to the data volume in the cloud storage system,
setting a path of data input/output from the computer instance to the target volume, whereby the target volume maps the input/output data from the computer instance directly to the target storage system using the second data placement without storing the input/output data to the cloud storage system and delete the data volume in the cloud storage system,
setting the computer instance to access the system volume on the cloud storage system directly and prohibit direct utilization of the data volume on the cloud storage system,
setting the computer instance to utilize the target volume on the target storage system and access data in the data volume on the cloud storage system by using the path between the computer instance and the target volume via a mapping between the target volume and the data volume on the cloud storage system,
copying the data in the data volume in the cloud storage system to the target volume,
after the copying of the data in the data volume is complete:
deleting the mapping from the target volume,
deleting the data volume in the cloud storage system while maintaining the system volume in the cloud storage system.

15. An information processing method for migrating a computer instance of a virtual computer to a cloud computer, the information processing method comprising:
migrating the computer instance to the cloud computer;
converting a first data placement of a data volume utilized by computer instance from a first storage system into a second data placement stored in a cloud storage system wherein the second data placement can be interpreted by the computer instance without using a respective hypervisor of a system volume of the first storage system;
migrating the system volume and the data volume utilized by the computer instance from the first storage system to the cloud storage system, wherein the first storage system and a target storage system have at least one incompatibility that prevents a remote copy of the data volume from the first storage system to the target storage system; and
after the migrating of the data volume is complete:
creating a target volume, wherein the target volume is mapped to the data volume in the cloud storage system,
setting a path of data input/output from the computer instance to the target volume, wherein the target volume maps to the data volume using the second data placement,
setting the computer instance to access the system volume on the cloud storage system directly and prohibit direct utilization of the data volume on the cloud storage system,
setting the computer instance to utilize the target volume on the target storage system and access a data in the data volume on the cloud storage system by using the path between the computer instance and the target volume via a mapping between the target volume and the data volume on the cloud storage system,
copying the data in the data volume in the cloud storage system to the target volume,
after the copying of the data in the data volume is complete:
deleting the mapping from the target volume, and
deleting the data volume in the cloud storage system while maintaining the system volume in the cloud storage system.

16. The information processing system according to claim 1,
wherein the target storage system further:
redundantly stores the data from the target volume and storage control data as redundant storage.

17. The information processing system according to claim 16, wherein:
the redundant storage includes a redundant volume of the target volume; and
a first computer instance that manages the redundant volume is different from a second computer instance that manages the target volume.

18. The information processing system according to claim 1, wherein the system volume stores an image of an OS (Operating System) for booting the computer instance to be migrated.

19. The information processing system according to claim 14, wherein the system volume stores an image of an OS (Operating System) for booting the computer instance to be migrated.

* * * * *